United States Patent
Mizusaki

(10) Patent No.: US 10,684,513 B2
(45) Date of Patent: Jun. 16, 2020

(54) LIQUID CRYSTAL DISPLAY AND PRODUCTION METHOD THEREFOR

(71) Applicant: SHARP KABUSHIKI KAISHA, Sakai, Osaka (JP)

(72) Inventor: Masanobu Mizusaki, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/123,386

(22) Filed: Sep. 6, 2018

(65) Prior Publication Data
US 2019/0079356 A1  Mar. 14, 2019

(30) Foreign Application Priority Data
Sep. 8, 2017 (JP) .................. 2017-172937

(51) Int. Cl.
*G02F 1/1337* (2006.01)
*G02F 1/1333* (2006.01)
*C09K 19/56* (2006.01)
*G02F 1/13363* (2006.01)
*C09K 19/04* (2006.01)

(52) U.S. Cl.
CPC ........ *G02F 1/133711* (2013.01); *C09K 19/56* (2013.01); *G02F 1/13363* (2013.01); *G02F 1/13378* (2013.01); *G02F 1/133345* (2013.01); *G02F 1/133753* (2013.01); *C09K 2019/0448* (2013.01); *G02F 1/133723* (2013.01); *G02F 2001/133738* (2013.01); *G02F 2001/133742* (2013.01); *G02F 2001/133757* (2013.01)

(58) Field of Classification Search
None
See application file for complete search history.

(56) References Cited

U.S. PATENT DOCUMENTS

| 2011/0310319 A1* | 12/2011 | Mizusaki | G02B 5/3083 349/33 |
| 2012/0008079 A1 | 1/2012 | Mizusaki et al. | |
| 2016/0187729 A1* | 6/2016 | Teraoka | G02F 1/133711 349/123 |
| 2016/0238886 A1* | 8/2016 | Yao | G02F 1/133528 |

FOREIGN PATENT DOCUMENTS

WO    2010/116551 A1    10/2010

* cited by examiner

*Primary Examiner* — Phu Vu
(74) *Attorney, Agent, or Firm* — ScienBiziP, P.C.

(57) ABSTRACT

A liquid crystal display includes a pair of substrates, a liquid crystal layer, and an alignment-controlling layer. The liquid crystal layer is disposed between the pair of substrates and includes a liquid crystal material. The alignment-controlling layer, which is formed by polymerization of a polymerizable monomer added to a liquid crystal composition forming the liquid crystal layer so as to be brought into contact with the liquid crystal layer, and controls an alignment of the liquid crystal material to the substrate at a predetermined angle. One substrate of the pair of substrates has an alignment film coated and formed so as to be brought into contact with the alignment-controlling layer, and the other substrate has no alignment film.

10 Claims, 5 Drawing Sheets ical field, a

LIQUID CRYSTAL DISPLAY AND PRODUCTION METHOD THEREFOR

CROSS REFERENCE TO RELATED APPLICATION

This application claims priority from Japanese Patent Application No. 2017-172937 filed on Sep. 8, 2017. The entire contents of the priority application are incorporated herein by reference.

TECHNICAL FIELD

The technology disclosed in the present specification relates to a liquid crystal display and a production method therefor.

BACKGROUND

A liquid crystal display has a liquid crystal panel on which information such as images is displayed, and the liquid crystal panel has a structure in which, roughly, a liquid crystal layer is sealed between a pair of glass substrates. The pair of substrates includes an array substrate (a pixel electrode substrate, an active matrix substrate, and an element substrate) on which switching elements (such as TFT) and pixel electrodes are provided in an array shape (aligned shape), and a counter substrate disposed opposite thereto. When a voltage is applied to between a common electrode provided on the array substrate or a counter electrode provided on the counter substrate and the pixel electrode, an alignment of a liquid crystal material (liquid crystal molecules) forming the liquid crystal layer is changed to adjust an amount of light passing through the liquid crystal layer, thereby displaying images on the liquid crystal panel.

In order to control the alignment of the liquid crystal material in a voltage non-applied state, conventionally, an alignment film-forming resin including polyimide (PI) has been coated on the side of each substrate nearest to the liquid crystal layer, then a high temperature treatment (baking) has been performed to form an alignment film, and the liquid crystal material has been aligned by a memory property of the alignment film. In a structure having such a conventional alignment film, a material design of the alignment film-forming resin is optimized, and an alignment treatment employing rubbing or light irradiation is performed if necessary, whereby a degree of alignment (alignment order parameter) of the liquid crystal material in the liquid crystal layer is increased to obtain a high contrast as well as an angle of alignment can be comparatively easily controlled. However, not only are many steps necessary for forming the alignment film but also issues, such as coating irregularity and dust generation caused by the rubbing or alignment treatment, occur. To solve this, a technology which does not require the use of the conventional alignment film (hereinafter referred to as "alignment film-less liquid crystal alignment technology") has been proposed in which a polymerizable monomer or the like is added to a liquid crystal composition and the polymerization is performed after the monomer is enclosed between substrates, thereby selectively forming a polymer layer at an interface between the liquid crystal layer and the substrate, and alignment-expressing functional groups are formed from the surface of this polymer layer, whereby the liquid crystal material is aligned.

Meanwhile, in order to meet requirements of increasing in size of a display screen, and the like, development of a horizontal alignment mode or a vertical alignment mode, configured to obtain a comparatively high contrast and a comparatively wide angle of visibility, has been advanced. Especially, it is known that according to a multi-domain vertical alignment (MVA) mode, a structure for regulating alignment is provided on a transparent electrode, whereby the alignment of a liquid crystal is changed per area of the screen, and the angle of visibility can be made wider. However, an aperture ratio may be decreased or light may leak out by the structure for regulating alignment. When the number of structures for regulating alignment is decreased in order to suppress the defects described above, then a response speed of the liquid crystal is lowered. Then, a method is proposed in which a liquid crystal composition to which a polymerizable monomer or the like has been added is enclosed between substrates, and the polymerizable monomer is polymerized in a state in which a liquid crystal material is aligned (see International Publication WO 2010/116551). This is a technology in which a polymer sustained alignment (PSA) layer is formed on a conventional alignment film to provide a pre-tilt angle (preliminary tilt angle) to the liquid crystal, whereby the delay of the response speed of the liquid crystal material is reduced while the number of structures for regulating alignment is decreased, and is referred to as "PSA technology".

According to the alignment film-less liquid crystal alignment technology described above, the alignment treatment using the rubbing cannot be performed and it is necessary to control the alignment of the liquid crystal only by the material design of the liquid crystal composition. It is difficult, accordingly, to sufficiently align the liquid crystals, and the increase of the contrast is a problem to be solved.

On the other hand, according to the structure in which the conventional alignment films are provided on the two substrates as the conventional PSA technology, the high contrast can be expressed, but various defects caused by the formation of the alignment film cannot be avoided. The defects caused by the formation of the alignment film may include, in the array substrate, electrical connection failure and occurrence of uneven alignment, caused by difficulty in precise control of an area on which the alignment film is formed, increased moisture absorbency due to thermal denaturation of a material for forming an insulating film, and the like; and in the counter substrate, thermal decomposition and elution of a color material of a color filter layer, thermal deviation of retardation (phase difference) of an intracellular phase difference layer, and the like. All of them reduce display reliability of a liquid crystal display.

SUMMARY

The present technology has been completed based on the circumstances described above, and provides a liquid crystal display configured to obtain a high contrast while suppressing a reduction in display reliability, caused by formation of an alignment film, and a production method therefor.

A liquid crystal display according to the present technology is a liquid crystal display including: a pair of substrates; a liquid crystal layer, which is disposed between the pair of substrates and includes a liquid crystal material; and an alignment-controlling layer, which is formed by polymerization of a polymerizable monomer added to a liquid crystal composition forming the liquid crystal layer so as to be brought into contact with the liquid crystal layer, and controls the alignment of the liquid crystal material to the substrate at a predetermined angle. In the liquid crystal display, one substrate of the pair of substrates has an alignment film coated and formed so as to be brought into contact with the alignment-controlling layer, and the other substrate has no alignment film.

In the structure described above, the "alignment film" refers to a so-called conventional alignment film, formed by subjecting a coating film of the alignment film-forming resin coated on the substrate to a high temperature treatment. It is preferable to subject the alignment film to an alignment treatment such as rubbing or light irradiation in order to increase the contrast.

According to the structure described above, because one substrate has the alignment film, a degree of alignment of the liquid crystal layer can be increased compared to the alignment film-less liquid crystal alignment technology, which has no conventional alignment film at all. The other substrate has no alignment film, but the alignment-controlling layer is formed so as to be brought into contact with the liquid crystal layer, by which the complement is attained, and thus the liquid crystal material can be sufficiently aligned as a whole and the contrast can be made higher. On the other hand, the other substrate has no alignment film, whereby various defects, caused by the formation of the alignment film, can be avoided in the other substrate. Accordingly, the structure described above is applied to the substrate easily causing the defects due to the formation of the alignment film as the other substrate, whereby both of the high contrast and the excellent display reliability can be obtained.

The liquid crystal display as described above can be produced by a method for producing a liquid crystal display, including: an alignment film-forming step in which one plate surface of one substrate is coated with an alignment film-forming resin and a high temperature treatment is performed to form an alignment film; a disposing step in which another substrate is disposed on the one plate surface side of the one substrate such that the plate surfaces are opposite to each other, and a liquid crystal composition including a liquid crystal material and a polymerizable monomer is disposed between the two substrates; and a polymerization step in which, after the disposing step, the polymerizable monomer in the liquid crystal composition is polymerized to form a liquid crystal layer containing the liquid crystal material, and an alignment-controlling layer, which is brought into contact with the liquid crystal layer and controls the alignment of the liquid crystal material to the two substrates at a predetermined angle, between the two substrates. In the process, the alignment-controlling layer includes a polymer formed by polymerization of the polymerizable monomer, and the other substrate has no alignment film.

According to the structure described above, by the conventional alignment film formed on the one substrate and the alignment-controlling layer formed so as to be brought into contact with the liquid crystal layer, the liquid crystal material is sufficiently aligned to increase the contrast and, at the same time, various defects, caused by the formation of the alignment film, are avoided in the other substrate, whereby a liquid crystal display having excellent display reliability can be produced.

According to the present technology, a liquid crystal display configured to display images with a high contrast and having excellent display reliability can be obtained.

DETAILED DESCRIPTION

Figure 1A:
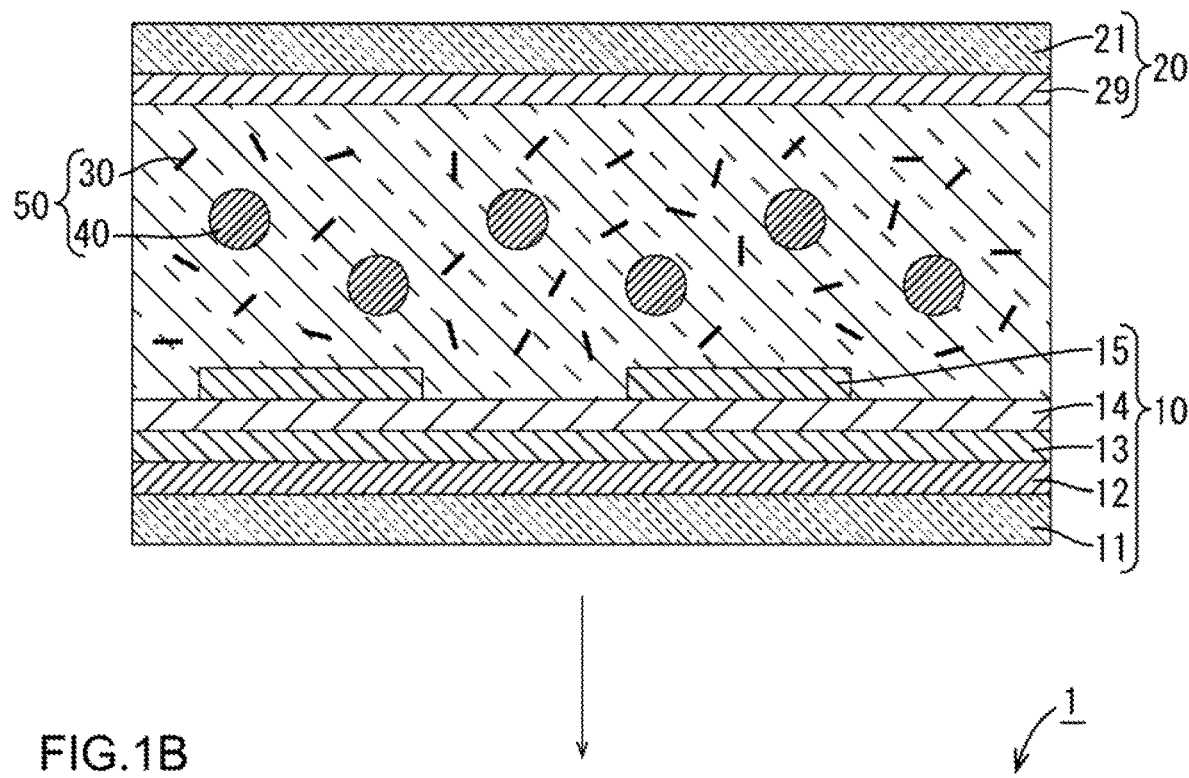
FIG. 1A is a schematic view showing a cross-sectional structure of a liquid crystal cell contained in a liquid crystal display according to a first embodiment before a polymerization step.

First Embodiment: Liquid Crystal Display Including Array Substrate Having NQD-Containing Organic Insulating Film but Having No Alignment Film, and Counter Substrate Having Alignment Film A first embodiment is explained using FIGS. 1A and 1B. The present first embodiment exemplifies a liquid crystal display including an array substrate 10 having an NQD-containing organic insulating film 12. In the present first embodiment, a counter substrate 20 has a conventional alignment film 29, while the array substrate 10 has no alignment film.

[Liquid Crystal Display]

The liquid crystal display according to the present first embodiment can be used as a display or a monitor in a TV receiver, a personal computer, a tablet terminal, or a cell phone.

The liquid crystal display includes a panel-shaped liquid crystal cell 1. The liquid crystal display may be any type of a transmission type, a reflection type and the like. The transmission type further includes a subsurface illuminator (not shown), which is disposed on a back side (side of the array substrate 10 described below) of the liquid crystal cell 1, and supplies light to the liquid crystal cell 1. The reflection type further includes a reflecting plate, which is disposed on a back side of the liquid crystal cell 1 and reflects light from outside toward the liquid crystal cell 1. On the outer side of the liquid crystal cell 1, a polarizing plate, a phase difference plate and the like, which are not shown in the drawing, are laminated.

[Liquid Crystal Cell]

Figure 1B:
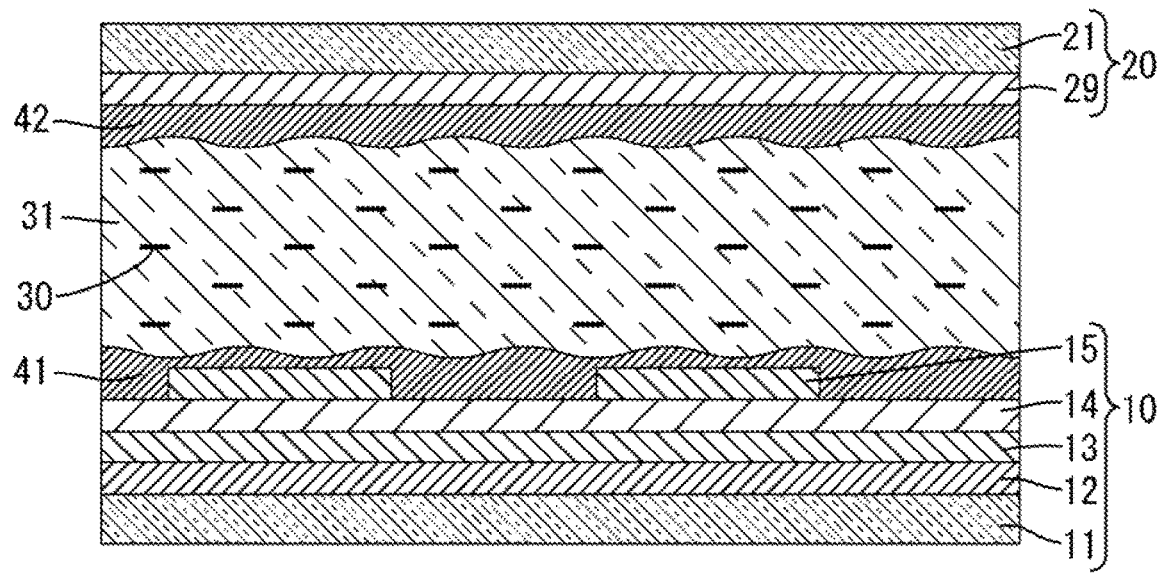
FIG. 1B is a schematic view showing a cross-sectional structure of the liquid crystal cell contained in the liquid crystal display according to a first embodiment after the polymerization step.

As shown in FIGS. 1A and 1B, the liquid crystal cell 1 includes the pair of substrates 10 and 20, disposed in the state in which the plate surfaces are opposite to each other, and a liquid crystal layer 31, which is disposed between the substrates 10 and 20 and contains liquid crystal materials 30 whose optical properties are changed by a voltage applied.

The two substrates 10 and 20 include respectively glass substrates 11 and 21 formed of alkali-free glass or quartz glass with excellent transparency, and multiple films are laminated on each glass substrate by an already known photolithography method, or the like.

(Array Substrate)

One substrate of the pair of substrates 10 and 20 is the array substrate 10. Although not shown in the drawing, on the glass substrate 11, switching elements (such as TFT) connecting to a source wiring and a gate wiring, which are orthogonal to each other, are provided in an array shape. In the liquid crystal cell 1, the substrates are designed such that the plate surface area of the array substrate 10 is larger than that of the counter substrate 20. The gate wiring and the source wiring, connected to the switching elements, are drawn out to a counter substrate non-superimposed area on the array substrate 10, and a terminal area TR for connecting to external terminals such as a signal transmission substrate, a driver, and a power source is provided on the counter substrate non-superimposed area (see FIG. 6).

As shown in FIG. 1A, in the array substrate 10, an organic insulating film 12, a common electrode 13, an inorganic insulating film 14, and pixel electrodes 15 are laminated in order from the glass substrate 11 side. Although not shown in the drawing, the pixel electrodes 15, disposed on the nearest side to the liquid crystal layer 31, are electrically connected to the switching element described above in contact holes (not shown) formed in the organic insulating film 12 and the inorganic insulating film 14.

The common electrode 13 and the pixel electrode 15 include, for example, a transparent conductive material such as indium tin oxide (ITO) or indium zinc oxide (IZO). The material of the inorganic insulating film 14 is not particularly limited, and a film formed from, for example, an inorganic material such as silicon oxide ($SiO_2$), silicon nitride ($SiN_x$), oxidized silicon nitride ($SiO_xN_y$, where x>y), or nitrided silicon oxide ($SiN_xO_y$, where x>y) may be appropriately used.

Although the present first embodiment has the structure in which the pixel electrodes 15 and the common electrode 13 are formed in the array substrate 10, but a structure in which the counter electrode is formed in the counter substrate 20 described below, instead of the common electrode 13, may be used.

(Organic Insulating Film)

The organic insulating film 12 in the present first embodiment is formed from an organic insulating film material including mainly a polymer, a photoacid generator, a photosensitizer, and the like. As the polymer, for example, a polymer having a high molecular weight such as polymethyl methacrylate may be used. The photoacid generator is an agent generating an acid by light irradiation, and is added to the organic insulating film material to obtain a chemically amplified material. By using it, surface roughness, caused by etching after coating and formation of the organic insulating film, is suppressed, whereby a diameter of a connected part between the switching element and the pixel electrode 15 can be preferably made fine, or a taper angle of a contact hole is increased, whereby a hole diameter (the maximum diameter) can be decreased.

Figure 5:
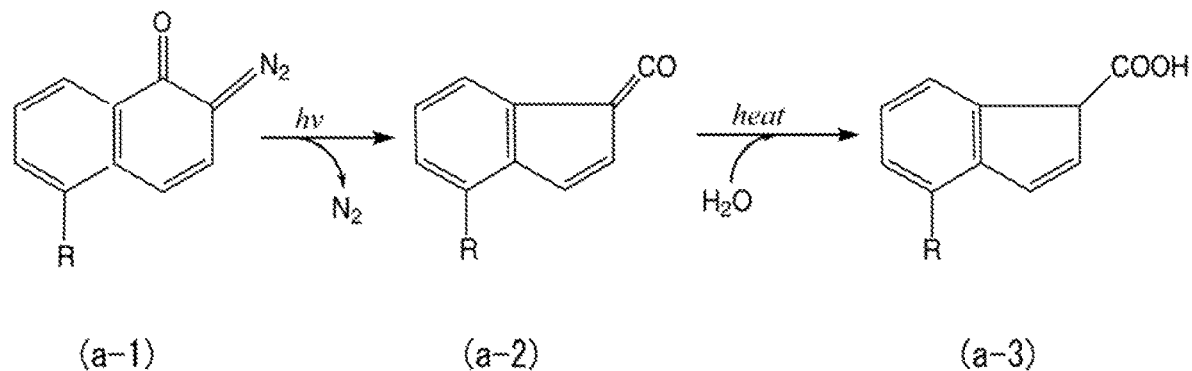
FIG. 5 is an explanatory diagram showing a mechanism in which a carboxylic acid is generated by heating naphthoquinone azide contained in an organic insulating film.

The organic insulating film 12 in the present first embodiment includes, as the photosensitizer, naphthoquinone azide (NQD), which is a positive resist material having a high resolution. When NQD is exposed to a high temperature, NQD (a-1) is formed into a carboxylic acid compound (a-3) having a high moisture absorbency through a compound (a-2) by a reaction shown in FIG. 5.

(Counter Substrate)

The other substrate of the pair of substrates 10 and 20 is the counter substrate 20. As shown in FIG. 1A, in the present first embodiment, a conventional alignment film 29 for aligning the liquid crystal material 30 is formed on the side of the counter substrate 20 nearest to the liquid crystal layer 31.

(Alignment Film)

The alignment film 29 is formed by coating the side of the counter substrate 20 nearest to the liquid crystal layer 31 with an alignment film-forming resin and performing a high temperature treatment. The thickness of the alignment film 29 is not particularly limited as long as the object of the present invention is not impaired, and is preferably, for example, from 10 nm to 300 nm. Already known resins may be used as the alignment film-forming resin, and it is preferable to use appropriately imidized polyamic acids in terms of the thermal stability and film-forming property. The polyamic acid is prepared as a liquid or sol composition (alignment agent) having flowability by being appropriately dissolved in an organic solvent. The polyamic acid can be imidized by processing the polyamic acid at a high temperature (such as 200 to 250° C.). The polymerization method of the polyamic acid is not particularly limited, and already known methods can be employed.

In order to form the alignment film 29, for example, first, the side of the counter substrate 20 nearest to the liquid crystal layer is coated with the alignment film-forming resin (alignment agent) containing the polyamic acid in an uncured state by an already known method such as a method using a spin coater or a roll coater. Subsequently, the coating film is subjected to pre-baking (for example, a heat treatment at 70° C. to 100° C. for one minute to 10 minutes) to remove the organic solvent, followed by baking (for example, a heat treatment at 200° C. to 250° C. for 8 minutes to 40 minutes) to imidize the polyamic acid or optimize the conformation. The heating time and the heating temperature in the pre-baking and the baking may be appropriately set depending on each object.

The alignment film 29 is appropriately selected from a vertical alignment film, which vertically aligns the liquid crystal material to the substrate, and a horizontal alignment film, which horizontally aligns the liquid crystal material to the substrate, depending on the object. These alignment films are utilized after being appropriately subjected to an alignment treatment such as a rubbing treatment or a photo-alignment treatment, in order to increase a degree of alignment of the liquid crystal layer 31. FIGS. 1A and 1B show a case in which a horizontal alignment film is used as the alignment film 29.

When the alignment film 29 is subjected to the alignment treatment, it is preferable to employ a photo-alignment treatment. According to the photo-alignment treatment, dust generation and breakage of the structure can be decreased compared to the rubbing alignment treatment.

In order to enable the photo-alignment treatment, it is preferable that the alignment film 29 has a photo-aligning group. The photo-aligning group is a functional group causing a reaction (such as a photoisomerization reaction) by irradiation of predetermined light (such as polarized UV) to change its structure. When the photo-aligning group is introduced into a side chain, a photo-alignment property can be given to the alignment film while the structure of the main chain is maintained. The photo-aligning group is preferably, for example, at least one group selected from the group consisting of an azobenzene group, a cyclobutane ring, a cinnamato group, and a coumarin group, in terms of the introduction property of the functional group into the side chain or the reactivity.

(Sealing Agent)

Figure 6:
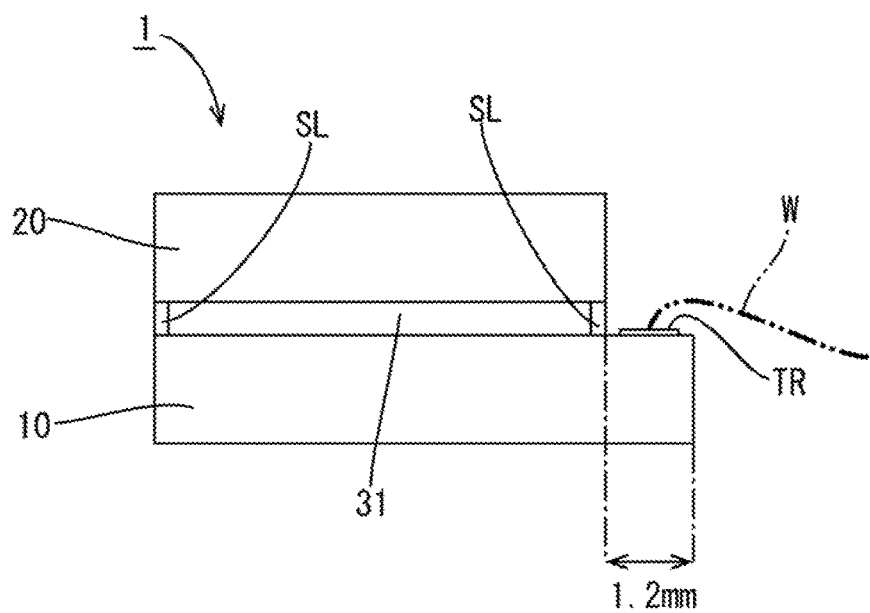
FIG. 6 is a schematic view showing a narrow frame liquid crystal display cell produced from a liquid crystal cell having the same structure as that in Example 1 or Comparative Example 1.

A sealing agent SL is put between the two substrates 10 and 20 in a state in which a cell gap having the same thickness as that of the liquid crystal layer 31 is maintained such that the agent encloses the liquid crystal layer 31 to seal the layer (see FIG. 6). The two substrates 10 and 20 are bonded together with this sealing agent.

An already known sealing agent can be used, and it is preferable to use, for example, a thermosetting, ultraviolet ray curable, or UV/thermosetting sealing agent containing an epoxy resin or an acrylic resin.

(Liquid Crystal Layer)

The liquid crystal layer 31 is formed containing the liquid crystal material 30 described below. The liquid crystal material 30 has a property causing alignment in a specific direction, and the alignment is controlled by applying a voltage of a threshold value or more. The liquid crystal alignment mode in a voltage non-applied state can be appropriately selected from among already known modes such as a twisted nematic (TN) mode in which the liquid crystals are aligned such that they are twisted in a thickness direction of the liquid crystal layer 31 in the voltage non-applied state; an in-plane switching (IPS) mode in which the liquid crystals are horizontally aligned relative to the substrate surface to crosswisely rotate them in the voltage non-applied state; and a vertical alignment (VA) mode in which the liquid crystals are vertically aligned relative to the substrate surface to perform the switching in a vertical electric field in the voltage non-applied state. The VA mode and the IPS mode are preferable in order to increase the contrast or to increase the angle of visibility. FIG. 1B shows the liquid crystal cell 1 in the IPS mode in which the liquid crystal material 30 is horizontally aligned relative to the two substrates 10 and 20 in the liquid crystal layer 31.

(Alignment-Controlling Layer)

As shown in FIG. 1B, the alignment-controlling layers 41 and 42 are formed on both sides of the liquid crystal layer 31, i.e., on both substrate sides of the array substrate 10 and the counter substrate 20 in the liquid crystal cell 1.

The alignment-controlling layers 41 and 42 are polymer layers which are selectively formed at interfaces between the liquid crystal layer 31 and the two substrates 10 and 20 by polymerizing the polymerizable monomer 40 (see FIG. 1A) contained in a liquid crystal composition 50 described below. The "interfaces between the liquid crystal layer 31 and the two substrates 10 and 20" refer to boundary surfaces between the structures, formed on the two glass substrates 11 and 21, disposed on the nearest side to the liquid crystal layer 31, and the liquid crystal layer 31. The alignment-controlling layers 41 and 42 are formed so as to be directly brought into contact with the liquid crystal layer 31.

In the present first embodiment, the conventional alignment film is not formed on the array substrate 10 side, and thus the alignment of the liquid crystal material 30 in the liquid crystal layer 31 is defined by the alignment-controlling layer 41 on the array substrate 10 side in a voltage non-applied state. On the other hand, the alignment of the liquid crystal material 30 is defined by the memory property of the alignment film 29, and the alignment-controlling layer 42, on the counter substrate 20 side.

[Liquid Crystal Composition]

The liquid crystal composition 50 in the present technology includes at least the liquid crystal material 30 and the polymerizable monomer 40.

(Liquid Crystal Material)

As the liquid crystal material 30, already known materials can be used. It is possible to use, for example, nematic liquid crystals, smectic liquid crystals, or the like, and it is preferable to use the nematic liquid crystals. The liquid crystal material 30 preferably has a high birefringence and a large optical anisotropy (Δn). In addition, the material can be selected so as to have a desired dielectric anisotropy (Δε) in accordance with the liquid crystal alignment mode or the like.

As a positive nematic liquid crystal having a positive dielectric anisotropy, it is possible to use, for example, biphenyl liquid crystals, phenyl cyclohexane liquid crystals, ester liquid crystals, terphenyl liquid crystals, biphenyl cyclohexane liquid crystals, pyrimidine liquid crystals, dioxane liquid crystals, bicyclooctane liquid crystals, cubane liquid crystals, and the like.

The negative nematic liquid crystal having a negative dielectric anisotropy may include, for example, (di)fluorine-containing liquid crystals, dicyanobenzene liquid crystals, pyridazine liquid crystals, Schiff base liquid crystals, azoquinone liquid crystals, biphenyl liquid crystals, phenyl cyclohexane liquid crystals, and the like.

A chiral agent or ferroelectric liquid crystals may be further added to the liquid crystals described above.

As the liquid crystal material 30, either of the positive liquid crystals or the negative liquid crystals can be used without any particular restriction.

(Polymerizable Monomer)

The liquid crystal composition 50 in the present first embodiment includes, in addition to the liquid crystal material 30 described above, a monomer which can be polymerized (polymerizable monomer 40). This can form the alignment-controlling layers 41 and 42 including the polymer, obtained by enclosing the liquid crystal composition 50 between the two substrates 10 and 20 and then polymerizing the polymerizable monomer 40. The polymerizable monomer 40 is preferably a radical polymerizable monomer, and more preferably a photopolymerizable monomer which can be polymerized by light irradiation. As the polymerizable monomer 40, a monomer which functions as a polymerization initiator per se may be used, or a polymerization initiator such as a photopolymerization initiator may be included in the liquid crystal composition 50. The polymerizable monomer 40 may be a mixture of two or more different kinds of monomers. It is known that when the alignment-controlling layers 41 and 42 are formed from a copolymer having two or more kinds of monomer units, both of the change of the pre-tilt angle and generation of a residual DC voltage can be suppressed, and thus it is difficult to cause burning.

It is preferable to use, as the polymerizable monomer 40, a monomer forming a polymer having side chains with an alignment property-expressing group by the polymerization thereof. The alignment property-expressing group refers to a comparatively bulky side chain derived from the main chain of the polymer forming the alignment-controlling layers 41 and 42, and a group having a function of aligning the liquid crystal material 30 at a certain angle by extending from the interfaces of the two layers 41 and 42 to the side of the liquid crystal layer 31 with which the layers are brought into contact. Even if the structure includes the conventional alignment film only on one substrate side (the counter substrate 20 side) as the liquid crystal cell 1 in the present first embodiment, accordingly, the liquid crystal material 30 in the liquid crystal layer 31 can be sufficiently aligned by providing the alignment-controlling layers 41 and 42 formed from the polymer having the alignment property-expressing group. The alignment property-expressing group can be classified into a vertical alignment property-expressing group, a horizontal alignment property-expressing group, and the like, depending on the angle at which the liquid crystal material 30 is aligned. When the structure of the polymerizable monomer 40 is appropriately selected, the structure of the alignment property-expressing group can be changed, and the angle of alignment of the liquid crystal material 30 can be controlled.

The polymerizable monomer 40 may be, for example, a group having a chalcone group or an azobenzene group as the horizontal alignment property-expressing group. More specifically, polymerizable monomers represented by the following chemical formulae (1) and (2) are preferable. When such a polymerizable monomer 40 is used, alignment-controlling layers 41 and 42, which horizontally align the liquid crystal material 30, are formed. When such alignment-controlling layers 41 and 42 are used together with a horizontal alignment film as the alignment film 29, the liquid crystal material 30 is horizontally aligned relative to the two substrates 10 and 20 by the layers and the film, whereby the degree of alignment of the liquid crystal layer 31 can be increased.

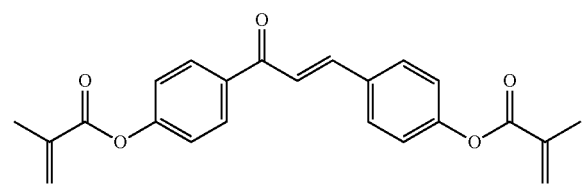

(1)

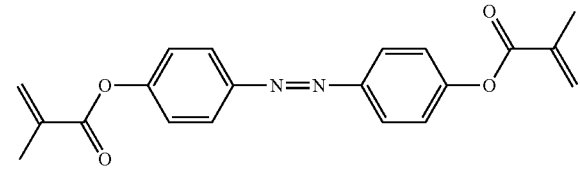

(2)

Alternatively, the polymerizable monomer 40 may be a monomer having a linear alkyl group with 8 or more and 24 or less carbon atoms as the vertical alignment property-expressing group. More specifically, a monomer represented by the following chemical formula (3) is preferable. When such a polymerizable monomer 40 is used, alignment-controlling layers 41 and 42, which vertically align the liquid crystal material 30, are formed. When such alignment-controlling layers 41 and 42 are used together with a vertical alignment film as the alignment film 29, the liquid crystal material 30 is vertically aligned relative to the two substrates 10 and 20 by the layers and the film, whereby the degree of alignment of the liquid crystal layer 31 can be increased.

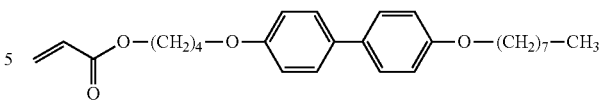

(3)

As described above, in the liquid crystal cell 1 in the present first embodiment, while the counter substrate 20 has the conventional alignment film 29, the array substrate 10 has no alignment film, and the alignment-controlling layers 41 and 42 having the alignment property-expressing group are formed on the two substrates 10 and 20 sides so as to be brought into contact with the liquid crystal layer 31.

According to the structure of the present first embodiment, because the counter substrate 20 (one of the substrates) has the alignment film 29, the degree of alignment of the liquid crystal layer 31 can be increased compared to the alignment film-less liquid crystal alignment technology having no conventional alignment film at all. Although the array substrate 10 (the other substrate) has no alignment film, the complement is attained by the alignment-controlling layers 41 and 42 formed so as to be brought into contact with the liquid crystal layer 31, and the liquid crystal material is sufficiently aligned and the contrast can be increased. On the other hand, the array substrate 10 has no alignment film, and thus various defects, caused by the formation of the alignment film, can be avoided in the array substrate 10.

Recently, narrowing of the counter substrate non-superimposed area has been advanced, for example, the frame width is made 2 mm or less, by a request to narrow the frame of the liquid crystal display. If the conventional alignment film is provided on the array substrate 10 side, accordingly, the alignment film-forming resin easily reaches the terminal area TR. If the terminal area TR is covered with the alignment film, because of the insulating property of the alignment film, trouble is caused on the electric connection to external terminals. In addition, the alignment film has a high hardness, and thus it is difficult to remove the alignment film once formed. If it is forcibly scraped away, wirings and terminal structures may be destroyed and disconnection may possibly occur. However, it is difficult to form the alignment film on the whole area of the limited image display area formed on the substrate superimposed area. If it is intended not to form the alignment film on a terminal-forming part, an area in which the alignment film is not formed is also made on the image display area, thus resulting in occurrence of uneven alignment, and the display reliability may possibly lower.

As in the present first embodiment, when the array substrate 10 is applied to the present technology as the other substrate having no alignment film, it is possible that the alignment film is not formed on the counter substrate non-superimposed area in the array substrate 10 while the alignment film 29 is formed throughout the whole image display area on the counter substrate 20 side, and the occurrence of the defects described above can be avoided and the lowering of the display reliability can be suppressed.

The array substrate 10 in the present first embodiment has the NQD-containing organic insulating film 12. When the conventional alignment film is formed on such an array substrate 10, NQD is converted into a carboxylic acid by the high temperature treatment or the like upon the formation of the alignment film (see FIG. 5), and the presence of the produced carboxylic acid accelerates capture speed of water into the liquid crystal cell 1, whereby the display reliability may be possibly lowered.

As in the present first embodiment, when the array substrate 10 having the NQD-containing organic insulating film 12 is applied to the present technology as the other substrate having no alignment film, the occurrence of the defects described above can be avoided while the sufficient degree of alignment is expressed, and the liquid crystal display having both of the high contrast and the excellent display reliability can be obtained.

The liquid crystal display in the present first embodiment can be produced by a method for producing a liquid crystal display, including: an alignment film-forming step in which one plate surface of the counter substrate 20 (one substrate) is coated with the alignment film-forming resin and the high temperature treatment is performed to form the alignment film 29; a disposing step in which the array substrate 10 (the other substrate) is disposed on the plate surface side of the counter substrate 20 on which the alignment film 29 is formed such that the plate surfaces are opposite to each other, and the liquid crystal composition 50 containing the liquid crystal material 30 and the polymerizable monomer 40 is disposed between the two substrates 10 and 20; and a polymerization step in which, after the disposing step, the polymerizable monomer 40 in the liquid crystal composition 50 is polymerized to form the liquid crystal layer 31 containing the liquid crystal material 30, and the alignment-controlling layers 41 and 42, which are brought into contact with the liquid crystal layer 31 and control the alignment of the liquid crystal material 30 to the two substrates 10 and 20 at a predetermined angle, between the two substrates 10 and 20.

The alignment-controlling layers 41 and 42 include the polymer, formed by the polymerization of the polymerizable monomer 40 contained in the liquid crystal composition 50 shown in FIG. 1A with light or heat, and, as shown in FIG. 1B, they are selectively formed at the interfaces between the two substrates 10 and 20 and the liquid crystal layer 31.

The polymerization step is preferably performed by light irradiation in order to suppress the thermal deterioration of the forming material. For that purpose, the polymerizable monomer 40 is preferably a photopolymerizable monomer. In order to increase the degree of alignment of the liquid crystal layer 31, which is formed at the same time as the alignment-controlling layers 41 and 42 are formed, the polymerization step is preferably performed at a nematic-isotropic phase transition temperature, Tni, of the liquid crystal composition 50 or higher by emitting polarized light. Alternatively, the polymerization step may be performed at Tni of the liquid crystal composition 50 or higher by emitting unpolarized light. In order to increase the degree of alignment of the liquid crystal layer 31, it is preferable to use a radical polymerizable monomer having an alignment property-expressing group as the polymerizable monomer 40.

According to the structure of the present first embodiment, owing to the conventional alignment film 29 formed in the counter substrate 20 (one substrate) and the alignment-controlling layers 41 and 42 formed so as to be brought into contact with the liquid crystal layer 31, the degree of alignment of the liquid crystal layer 31 is increased whereby the high contrast can be expressed as well as the situation in which the array substrate 10 (the other substrate) is exposed to a high temperature is avoided, whereby the occurrence of the defects caused by the situation is suppressed. As a result, the liquid crystal display having the excellent display reliability can be produced.

Second Embodiment: Liquid Crystal Display Including Array Substrate Having Alignment Film and Counter Substrate Having Color Filter Layer and Intracellular Phase Difference Layer but Having No Alignment Film A second embodiment is explained using FIGS. 2A and 2B. The present second embodiment exemplifies a liquid crystal display including a counter substrate 220 having a color filter layer 22 and an intracellular phase difference layer 24. In the present second embodiment, an array substrate 210 has a conventional alignment film 19, and the counter substrate 220 has no alignment film, unlike the first embodiment. Hereinafter, the same structures as those in the first embodiment are marked with the same numbers, and overlapped explanations are omitted (the same applies to the third embodiment and the fourth embodiment). FIG. 2B shows an IPS mode liquid crystal cell 201 in which a liquid crystal material 30 is horizontally aligned relative to the two substrates 210 and 220 in a liquid crystal layer 31.

(Counter Substrate)

Figure 2A:
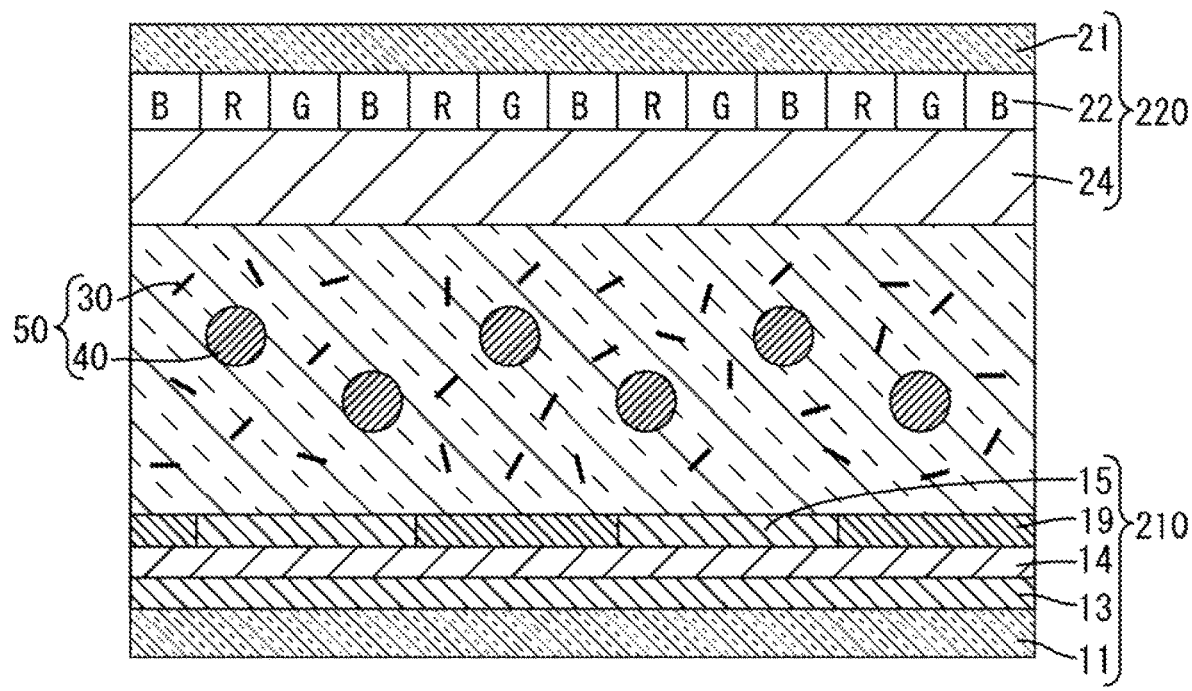
FIG. 2A is a schematic view showing a cross-sectional structure of a liquid crystal cell contained in a liquid crystal display according to a second embodiment before a polymerization step.
Figure 2B:
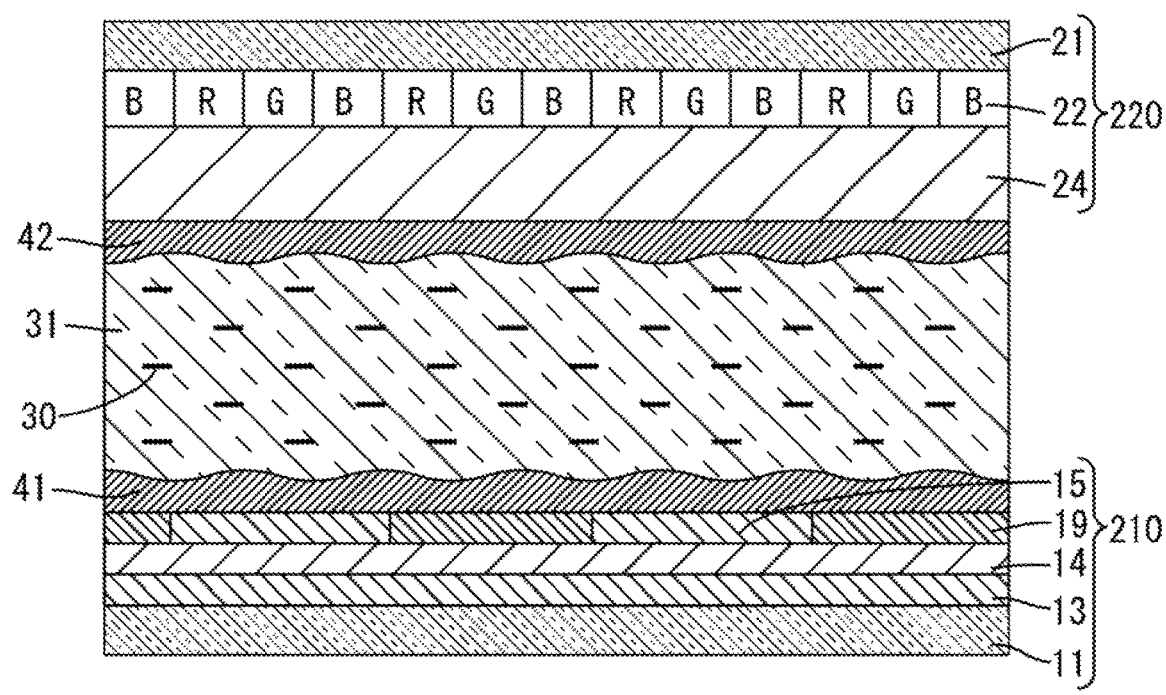
FIG. 2B is a schematic view showing a cross-sectional structure of the liquid crystal cell contained in the liquid crystal display according to a second embodiment after the polymerization step.

The liquid crystal cell 201 in the present second embodiment is formed such that a color image can be displayed and, as shown in FIG. 2A, the color filter layer 22 and the intracellular phase difference layer 24 are laminated in order from a glass substrate 21 side in the counter substrate 220.

(Color Filter Layer)

In the color filter layer 22, a number of coloring parts of R (red), G (green) and B (blue) are disposed in parallel in a matrix shape such that they are superimposed on pixel electrodes 15 in the array substrate 210, disposed opposite to the counter substrate 220, in plan view. Although not shown in the drawing, a substantially lattice-shaped light-shielding layer (black matrix) for preventing mixed colors is formed between the coloring parts forming the color filter layer 22, and the light-shielding layer is disposed while being superimposed on the gate wiring and the source wiring described above in plan view. Red pixels having the R coloring part, green pixels having the G coloring part, and blue pixels having the B coloring part are repeatedly aligned in one direction of the plate surface of the liquid crystal cell 201 to form a pixel group, and a number of the pixel groups are disposed in a vertical direction to the one direction.

(Intracellular Phase Difference Layer)

The intracellular phase difference layer 24 is one kind of optically functional layers for compensating the phase difference of light moving in the liquid crystal layer 31 including an anisotropic medium with a birefringence. The intracellular phase difference layer 24 is translucent and gives a phase difference with a predetermined wavelength to transmitted light. The phase difference is often controlled using a phase difference plate, laminated together with the polarizing plate outside the liquid crystal cell. When the intracellular phase difference layer 24 is formed in the liquid crystal cell 201, the surface is protected from damage and the lowering of optical functions can be suppressed. The intracellular phase difference layer 24 may include, for example, a liquid crystalline polymer layer, which is solidified in a state in which a specific alignment is given, and a ground layer, which provides the alignment to the liquid crystalline polymer.

(Array Substrate)

As shown in FIG. 2A, in the array substrate 210 in the present second embodiment, the common electrode 13, the inorganic insulating film 14, and the pixel electrodes 15 are laminated in order from the glass substrate 11 side, and the conventional alignment film 19 for aligning the liquid crystal material is formed so as to cover the side of the surface nearest to the liquid crystal layer 31.

(Alignment Film)

As the alignment film 19, the same film as the alignment film 29 formed in the counter substrate 20 in the first embodiment may be used. The film, accordingly, is formed by coating the side of the array substrate 210 nearest to the liquid crystal layer 31 with the alignment film-forming resin, and performing the high temperature treatment. As the alignment film-forming resin, the same resin as used in the alignment film 29 may be used, and the film formation can be performed in the same steps as those in the formation of the alignment film 29. As the alignment film 19, a vertical alignment film or a horizontal alignment film may be appropriately selected depending on the object, and an alignment treatment may be appropriately performed. FIGS. 2A and 2B exemplify a case in which the horizontal alignment film is used as the alignment film 19.

As described above, in the liquid crystal cell 201 in the present second embodiment, while the array substrate 210 has the conventional alignment film 19, the counter substrate 20 having the color filter layer 22 and the intracellular phase difference layer has no alignment film.

When the conventional alignment film, formed through the high temperature treatment (baking process, or the like), is provided on the counter substrate 220 having the color filter layer 22, the color materials in the filter are decomposed by exposing the color filter layer 22 to a high temperature, and the decomposed color materials are eluted on the liquid crystal layer 31, whereby the lowering of the display reliability may possibly be caused.

As in the present second embodiment, when the counter substrate 220 is applied to the present technology as the other substrate having no alignment film, the occurrence of the defects described above is avoided and the lowering of the display reliability is suppressed.

When the alignment film is formed in the counter substrate 220 having the intracellular phase difference layer 24, the retardation is changed to cause variation due to the high temperature treatment upon the formation of the alignment film, and the visibility and the contrast on the display surface become heterogeneous, thus resulting in a possibility that the display quality is lowered.

As in the present second embodiment, when the counter substrate 220 having the intracellular phase difference layer 24 is applied to the present technology as the other substrate having no alignment film, the occurrence of the defects described above is avoided, and a liquid crystal display having both of the high contrast and the excellent display reliability can be obtained.

The liquid crystal display of the present second embodiment can be produced by a method for producing a liquid crystal display, including: an alignment film-forming step in which one plate surface of the array substrate (one substrate) 210 is coated with the alignment film-forming resin and the high temperature treatment is performed to form the alignment film 19; a disposing step in which the counter substrate (the other substrate) 220 is disposed on the plate surface of the array substrate 210 on which the alignment film 19 is formed such that the plate surfaces are opposite to each other, and the liquid crystal composition containing the liquid crystal material 30 and the polymerizable monomer 40 is disposed between the two substrates 210 and 220; and a polymerization step in which, after the disposing step, the polymerizable monomer 40 in the liquid crystal composition is polymerized to form the liquid crystal layer 31 containing the liquid crystal material 30, and the alignment-controlling layers 41 and 42, which are brought into contact with the liquid crystal layer 31 and control the alignment of the liquid crystal material 30 to the two substrates 210 and 220 at a predetermined angle, between the two substrates 210 and 220.

Third Embodiment: Liquid Crystal Display Having Alignment Division Control Structure, Including Array Substrate Having NQD-Containing Organic Insulating Film but Having No Alignment Film, and Counter Substrate Having Alignment Film Configured to Control Pre-Tilt Angle of Liquid Crystal Material to Predetermined Range A third embodiment is explained using FIGS. 3A and 3B. The present third embodiment is different from the first embodiment in that a pre-tilt angle having a predetermined range is imparted to a liquid crystal material on the side of a counter substrate 320 having a conventional alignment film 329, and the display has an alignment division control structure. In addition, in the first embodiment, the structure in which the pixel electrodes 15 and the common electrode 13 are formed in the array substrate 10 has been described, but in the present third embodiment, the common electrode is not formed in the array substrate 310, and a structure in which a counter electrode 23 is formed in the counter substrate 320 is described, instead. FIG. 3B shows a VA mode liquid crystal cell 301 having a 2-division control structure, in which a pre-tilt angle having a predetermined range is imparted to a liquid crystal material 30 on the counter substrate 320 side.

(Array Substrate)

Figure 3A:
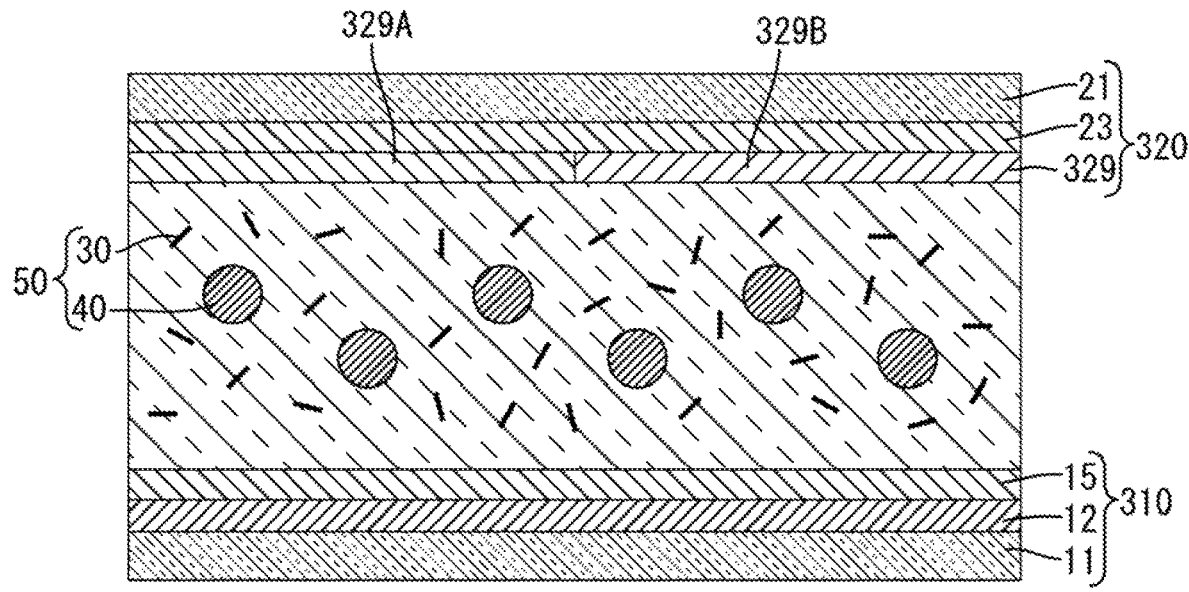
FIG. 3A is a schematic view showing a cross-sectional structure of a liquid crystal cell contained in a liquid crystal display according to a third embodiment before a polymerization step.
Figure 3B:
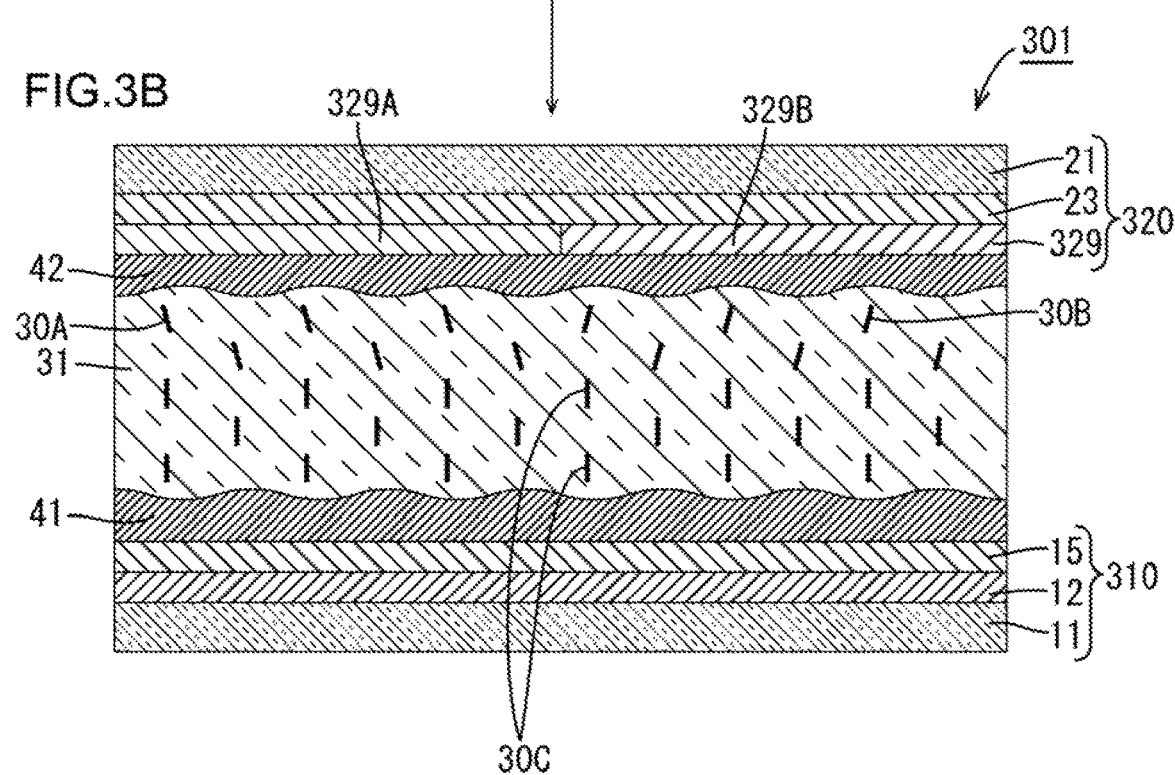
FIG. 3B is a schematic view showing a cross-sectional structure of the liquid crystal cell contained in the liquid crystal display according to the third embodiment after the polymerization step.

As shown in FIG. 3A, in the array substrate 310, an organic insulating film 12 and a pixel electrode 15 are laminated in order from the glass substrate 11 side. In the present third embodiment, a voltage is applied to between the pixel electrode 15 and the counter electrode 23 formed in the counter substrate 320 described below.

(Counter Substrate)

As shown in FIG. 3A, the counter electrode 23 is formed on a glass substrate 21 in the counter substrate 320, and the conventional alignment film 329 is laminated on a liquid crystal layer 31 side of the counter electrode 23.

(Alignment Film)

The alignment film 329 is formed by coating the side of the counter substrate 320 nearest to the liquid crystal layer 31 with an alignment film-forming resin, and performing a high temperature treatment, as the alignment film 29 in the first embodiment. As the alignment film-forming resin, the same resins used as in the alignment film 29 may be used, and the film can be formed in the same method as in the formation of the alignment film 29. FIGS. 3A and 3B exemplify a case in which a horizontal alignment film is used as the alignment film 329.

(Control of Pre-Tilt Angle)

The alignment film 329 in the present third embodiment can control the pre-tilt angle of the liquid crystal material 30 to a predetermined range.

In a case of using, as the alignment film 329, a horizontal alignment film which horizontally aligns the liquid crystal material to the substrate, it is preferable that the pre-tilt angle of the liquid crystal material 30 is controlled to more than 0° and 10° or less, in order to increase the response speed, and it is more preferable that the angle is controlled to more than 0° and 5° or less, in order to obtain a large capacity modulation. Alternatively, in a case of using, as the alignment film 329, a vertical alignment film which vertically aligns the liquid crystal material to the substrate, it is preferable that the pre-tilt angle of the liquid crystal material 30 is controlled to less than 90° and 80° or more in order to increase the response speed, and it is more preferable that the angle is controlled to less than 90° and 85° or more in order to obtain a large capacity modulation. FIGS. 3A and 3B exemplify a case in which the alignment film 329 is treated such that a pre-tilt angle of less than 90° and 80° or more is imparted to the film.

It is preferable that the alignment film 329 is subjected to an alignment treatment such as rubbing or light irradiation. When the alignment film 329 is subjected to the alignment treatment under appropriate conditions, it is possible to control the pre-tilt angle of the liquid crystal material 30 to the range described above.

The alignment treatment conditions can be selected using preliminary experiments, or the like. For example, with respect to photo-alignment treatment conditions when a photo-alignment film 329 having a photo-aligning group is subjected to the photo-alignment treatment; in other words, a wavelength and a strength of polarized UV, and an irradiation angle to the substrate, the parameters can be selected based on the results obtained in an experiment in which a series of liquid crystal cells for evaluation are produced using substrates whose parameters described above are gradually changed, and pre-tilt angles of the liquid crystal material are measured by an already known measurement method such as a crystal rotation method. Alternatively, treatment conditions in a case of the alignment treatment of rubbing can be selected from measurements in which a series of liquid crystal cells for evaluation whose rubbing alignment conditions, i.e., a kind and strength of a rubbing cloth, and a speed and the number of revolutions of rubbing are changed are produced, and pre-tilt angles of the liquid crystal material are measured.

(Alignment Division Control Structure)

The liquid crystal cell 301 in the present third embodiment has also an alignment division control structure in which the liquid crystal material 30 is aligned in a different direction per area.

It is possible to have the alignment division control structure by performing a treatment in which, when the alignment film 329 is subjected to the alignment treatment, conditions are changed per area. For example, a first light irradiation is performed to a photo-alignment film 329 having a photo-aligning group in a situation in which the substrate is partially covered with a mask, and then a second light irradiation is performed in a situation different from that of the first light irradiation, in which the mask is changed or moved to expose an area different from the area treated in the first light irradiation to light, whereby an alignment film 329, which aligns the liquid crystal material 30 in a different direction or at a different angle per area can be obtained, i.e., the liquid crystal cell 301 having the alignment division control structure can be obtained. The display area can be divided into any number of areas by changing the number of division irradiations. It is also possible to obtain the alignment division control structure by using a substrate having a structure for regulating the alignment with protrusions and depressions of fine linear protrusions (bank-shaped structures) or slits (groove-shaped structures) formed on the electrode portion, as the glass substrate 21 in the counter substrate 320.

FIG. 3B exemplifies a two-divided VA mode liquid crystal cell 301, obtained by covering a right half or a left half of the substrate with a mask, and emitting polarized UV to the plate surface of the substrate from different directions. In FIG. 3B, the alignment film 329 imparts a pre-tilt angle of less than 90° and 80° or more to liquid crystal materials 30A and 30B, disposed in the vicinity of the counter substrate 320, among the liquid crystal materials forming the liquid crystal layer 31. Of these, the pre-tilt angle is imparted to the liquid crystal material 30A, disposed on the left side, by an alignment film 329A on the left side, and the alignment is performed such that the material stands up at an angle of less than 90° and 80° or more clockwise relative to the counter substrate 320 in FIGS. 3A and 3B. On the other hand, the pre-tilt angle is imparted to the liquid crystal material 30B, disposed on the right side of the liquid crystal layer 31, by an alignment film 329B on the right side, and the alignment is performed such that the material stands up at an angle of less than 90° and 80° or more counterclockwise relative to the counter substrate 320 in FIGS. 3A and 3B. As described above, the direction or angle of the alignment of the liquid crystal material 30A and the liquid crystal material 30B can be changed per area. The alignment of a liquid crystal material 30C disposed on the array substrate 10 side among the liquid crystal materials forming the liquid crystal layer 31 is defined by the alignment-controlling layer 41, and the like, and the material is aligned almost vertically (90°) to the substrates 310 and 320.

The alignment division control structure is not limited to the two-divided structure shown in FIGS. 3A and 3B, and for example a four-divided liquid crystal cell may be obtained by emitting the polarized UV four times to a substrate whose surface is covered with a mask three quarters each.

In the alignment film-less liquid crystal alignment technology having no alignment film at all, it is necessary to control the alignment of the liquid crystal only by the material design of the liquid crystal composition, and it is difficult to minutely control the angle of alignment (pre-tilt angle) of the liquid crystal material 30 in the liquid crystal layer 31.

According to the structure of the present third embodiment, while the alignment film is not formed in the array substrate (the other substrate) 310 and thus the occurrence of the defects caused by the formation is avoided, the pre-tilt angle of the liquid crystal material can be comparatively arbitrarily controlled on the counter substrate 320 side by performing the alignment treatment of the alignment film 329 formed in the counter substrate (the one substrate) 320 under the appropriate conditions. When the alignment of the liquid crystal material 30 is controlled such that the pre-tilt angle is more than 0° and 10° or less, or less than 90° and 80° or more, it is easy to cause the electric field reaction of the liquid crystal material, whereby the response speed can be increased, in the horizontal alignment mode or vertical alignment mode liquid crystal display.

In order to change the alignment of the liquid crystal per area in the alignment film-less liquid crystal alignment technology, it is necessary that the alignment-controlling layer is controlled such that the characteristics thereof are partially different from each other, and it is difficult to perform the alignment division control.

According to the structure of the present third embodiment, while the alignment film is not formed in the array substrate (the other substrate) 310 whereby the occurrence of the defects caused by the formation is avoided, multiple areas in which the liquid crystal material 30 is aligned in different directions or at different angles are formed on the counter substrate (the one substrate) 320 having the alignment film 329, whereby the alignment division control of the liquid crystal cell 301 is performed, and a drive voltage can be reduced and the angle of visibility can be made large.

Fourth Embodiment: Liquid Crystal Display Including Array Substrate Having Alignment Film which can Control Pre-Tilt Angle of Liquid Crystal Material to Predetermined Range, and Counter Substrate Having Color Filter Layer and Intracellular Phase Difference Layer but Having No Alignment Film A fourth embodiment is explained using FIGS. 4A and 4B. The present fourth embodiment is different from the second embodiment in that a pre-tilt angle with a predetermined range is imparted to a liquid crystal material on the side of an array substrate 410 having a conventional alignment film 419. In addition, in the second embodiment, the structure in which the pixel electrode 15 and the common electrode 13 are formed in the array substrate 210 has been described, but in the present fourth embodiment, the common electrode is not formed in the array substrate 410, and a structure in which a counter electrode 23 is formed in a counter substrate 420 is described, instead. FIG. 4B shows an ECB mode liquid crystal cell 401 in which a pre-tilt angle with a predetermined range is imparted to a liquid crystal material 30 on the array substrate 410 side.

(Counter Substrate)

Figure 4A:
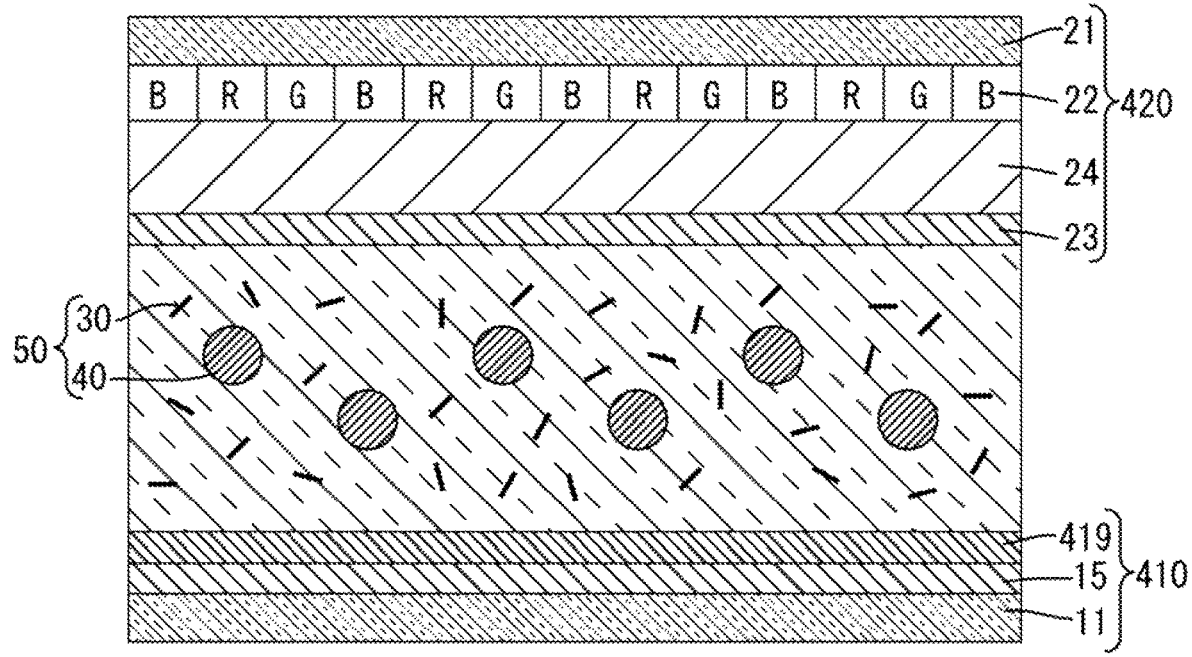
FIG. 4A is a schematic view showing a cross-sectional structure of a liquid crystal cell contained in a liquid crystal display according to a fourth embodiment before a polymerization step.
Figure 4B:
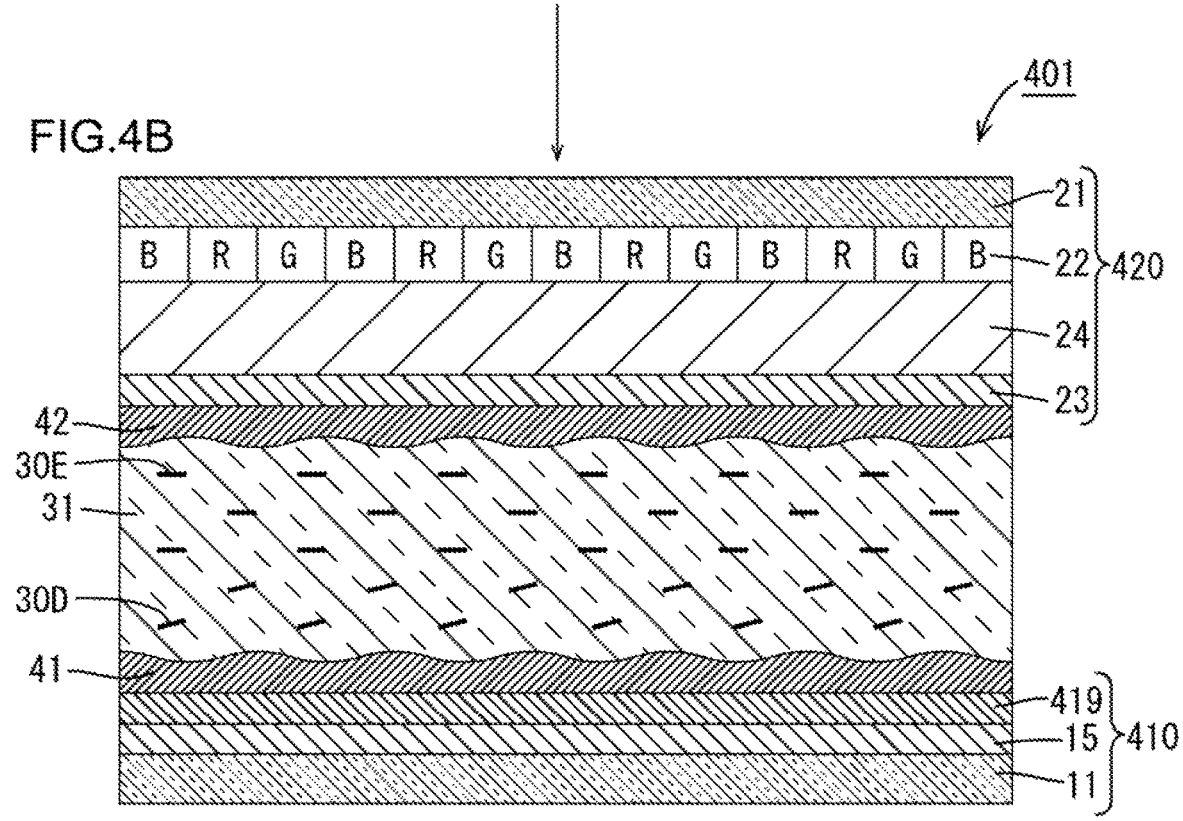
FIG. 4B is a schematic view showing a cross-sectional structure of the liquid crystal cell contained in the liquid crystal display according to the fourth embodiment after the polymerization step.

As shown in FIG. 4A, in the counter substrate 420, a color filter layer 22, an intracellular phase difference layer 24, and a counter electrode 23 are formed in order from a glass substrate 21 side.

(Array Substrate)

As shown in FIG. 4A, a pixel electrode 15 is formed on a glass substrate 11 in the array substrate 410, and a conventional alignment film 419 is laminated on a liquid crystal layer 31 side of the pixel electrode 15.

(Alignment Film)

The alignment film 419 is formed by coating the side of the array substrate 410 nearest to the liquid crystal layer 31 with an alignment film-forming resin, and performing a high temperature treatment, as the alignment film 19 in the second embodiment. The film can be formed using, as the alignment film-forming resin, the same resin as used in the alignment film 19 in the same manner as the formation of the alignment film 19. FIGS. 4A and 4B exemplify a case in which a horizontal alignment film is used as the alignment film 419.

(Control of Pre-Tilt Angle)

The alignment film 419 in the present fourth embodiment can control the pre-tilt angle of the liquid crystal material 30 to a predetermined range, as the alignment film 329 in the third embodiment. As in the case of the alignment film 329 in the third embodiment, in a case of using, as the alignment film 419, a horizontal alignment film, it is preferable that the pre-tilt angle is controlled to more than 0° and 10° or less in order to increase the response speed, and it is more preferable that the angle is controlled to more than 0° and 5° or less in order to obtain a large capacity modulation. Alternatively, in a case of using, as the alignment film 419, a vertical alignment film, it is preferable that the pre-tilt angle is controlled to less than 90° and 80° or more in order to increase the response speed, and it is more preferable that the angle is controlled to less than 90° and 85° or more in order to obtain a large capacity modulation.

FIG. 4B exemplifies an ECB mode liquid crystal cell 401 in which a pre-tilt angle with a predetermined range is imparted to a liquid crystal material 30D disposed in the vicinity of the array substrate 410. In FIG. 4B, while the alignment film 419 imparts a pre-tilt angle of more than 0° and 10° or less to the liquid crystal material 30D, disposed in the vicinity of the array substrate 410, among the liquid crystal materials forming the liquid crystal layer 31, the alignment of a liquid crystal material 30E, disposed on the counter substrate 420 side is defined by the alignment-controlling layer 42, and it is aligned almost horizontally (0°) to the substrates 410 and 420.

EXAMPLES

The present technology is explained in further detailed using Examples. The present technology is not limited to Examples described below at all.

Example 1

(Preparation of Liquid Crystal Composition)

In a negative liquid crystal material was contained 1.2% by weight of a radical polymerizable monomer represented by the following chemical formula (1), which had a chalcone group as a horizontal alignment property-expressing group, to prepare a negative liquid crystal composition (a nematic-isotropic phase transition temperature, Tni, of 85° C., a dielectric anisotropy Δε of −3.5, and an optical anisotropy Δn of 0.095).

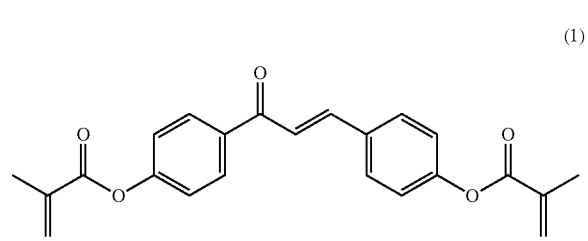 [SMILES: C=C(C)C(=O)Oc1ccc(/C=C/C(=O)c2ccc(OC(=O)C(=C)C)cc2)cc1]

(1)

(Fabrication of Liquid Crystal Cell)

Using the negative liquid crystal composition prepared as above, a liquid crystal cell 1 in the first embodiment shown in FIGS. 1A and 1B was fabricated as follows:

An array substrate 10, in which an organic insulating film 12 containing NQD as a positive resist, a common electrode 13 formed from ITO, an inorganic insulating film 14 formed from SiN, and pixel electrodes 15 formed from ITO were laminated in order on one plate surface of a glass substrate 11, was prepared.

Meanwhile, a glass substrate 21 having no electrode was prepared, and one plate surface thereof was coated with a polyamic acid alignment agent containing an azobenzene group as a photo-aligning group, which horizontally aligned the liquid crystals. A pre-baking at 90° C. for 5 minutes, a primary baking at 120° C. for 20 minutes, a photo-alignment treatment in which polarized UV (2 J/cm², 365 nm) was emitted from a normal direction, and a secondary baking at 230° C. for 40 minutes were sequentially performed to form an alignment film 29 which horizontally aligned the liquid crystals (alignment film-forming step), which was used as a counter substrate 20.

Next, a UV-curable sealing agent was drawn on a plate surface of the array substrate 10 on which the pixel electrodes 15 were formed using a dispenser, and the negative liquid crystal composition, prepared as above, was added dropwise to a given position on the plate surface of the counter substrate 20 on which the alignment film 29 was formed. Subsequently, the two substrates 10 and 20 were stuck together in vacuo and the sealing agent was cured using ultraviolet light (disposing step).

Subsequently, polarized UV (5 J/cm², 365 nm) was emitted from the array substrate 10 side (the substrate side on which the polyamic acid photo-alignment film was not formed) in a heated state having a temperature of 95° C. to polymerize the polymerizable monomer 40 in the liquid crystal composition 50, whereby alignment-controlling layers 41 and 42, which horizontally aligned the liquid crystals, were formed at the interfaces between the liquid crystal layer 31 and the two substrates 10 and 20 (polymerization step).

As described above, a horizontal alignment liquid crystal cell 1 of Example 1, including the array substrate 10 having the NQD-containing organic insulating film 12 but having no alignment film, and the counter substrate 20 having the alignment film 29, was completed.

Comparative Example 1

A liquid crystal cell of Comparative Example 1 was fabricated in the same manner as in Example 1 except that polyamic acid horizontal photo-alignment films were formed on the outermost layers of plate surfaces of a pair of glass substrates, disposed opposite to each other, in the same steps as in Example 1, and the photo-alignment treatment by irradiation of polarized UV was performed.

By the method described above, the horizontal alignment liquid crystal cell of Comparative Example 1, including an array substrate having an NQD-containing organic insulating film and an alignment film, and a counter substrate having an alignment film, was obtained.

Comparative Example 2

A liquid crystal cell of Comparative Example 2 was fabricated in the same manner as in Example 1 except that a polyamic acid horizontal photo-alignment film was not formed on any substrate of the pair of glass substrates.

By the method described above, the horizontal alignment liquid crystal cell of Comparative Example 2, including an array substrate having an NQD-containing organic insulating film but having no alignment film, and a counter substrate having no alignment film, was obtained.

Comparative Example 3

According to the same steps as in Example 1, a polyamic acid horizontal photo-alignment film was formed on the outermost layer of a plate surface of a glass substrate on which an NQD-containing organic insulating film, a common electrode formed from ITO, an SiN inorganic insulating film, and pixel electrodes formed from ITO were laminated in order, and the photo-alignment treatment by irradiation of polarized UV was performed. On the other hand, a polyamic acid horizontal photo-alignment film was not formed on a glass substrate having no electrode. A liquid crystal cell of Comparative Example 3 was fabricated in the same manner as in Example 1 except for the above.

By the method described above, the horizontal alignment liquid crystal cell of Comparative Example 3, including an array substrate having an NQD-containing organic insulating film and an alignment film, and a counter substrate having no alignment film, was obtained.

[Evaluation of Liquid Crystal Cells from Example 1, and Comparative Example 1 to Comparative Example 3]

[Evaluation of Contrast (High Temperature BL Exposure Test)]

Illuminances of each liquid crystal cell, which was a target for evaluation, upon black display and white display, were measured in an environment having a temperature of 25° C. using UL-1 manufactured by Topcon Corporation, and a contrast was obtained (initial stage). After that, a high temperature BL exposure test was performed in which back light (BL) exposure (aging) was performed for 1000 hours in an environment having a temperature of 80° C. After the high temperature BL exposure test, VHR of the resulting liquid crystal cell was measured under the same conditions as those in the measurement before the test was performed (after the high temperature BL 1000 h exposure test). The results are shown in Table 1.

[Measurement of Voltage Holding Ratio (VHR) (High Temperature BL Exposure Test)]

VHR of each liquid crystal cell, which was a target for evaluation, was measured under conditions of a voltage of 1 V and a temperature of 70° C. using a 6254 type VHR-measuring system manufactured by TOYO Corporation (initial stage). After that, a high temperature BL exposure test was performed in which BL exposure was performed for 1000 hours in an environment having a temperature of 80° C. After the high temperature BL exposure test, VHR of the resulting liquid crystal cell was measured under the same conditions as those in the measurement before the test was performed (after the high temperature BL 1000 h exposure test). The results are shown in Table 1.

TABLE 1

| | PIXEL ELECTRODE SUBSTRATE (INCLUDING NQD-CONTAINING INTERLAYER INSULATING FILM) | COUNTER SUBSTRATE | LIQUID CRYSTAL COMPOSITION [POLYMERIZABLE MONOMER] |
|---|---|---|---|
| EXAMPLE 1 | NO ALIGNMENT FILM | INCLUDING ALIGNMENT FILM | NEGATIVE LIQUID CRYSTAL MATERIAL (HORIZONTAL ALIGNMENT) CHALCONE GROUP-CONTAINING MONOMER OF CHEMICAL FORMULA (1) |
| COMPARATIVE EXAMPLE 1 | INCLUDING ALIGNMENT FILM | INCLUDING ALIGNMENT FILM | |
| COMPARATIVE EXAMPLE 2 | NO ALIGNMENT FILM | NO ALIGNMENT FILM | |
| COMPARATIVE EXAMPLE 3 | INCLUDING ALIGNMENT FILM | NO ALIGNMENT FILM | |

| | CONTRAST | | VHR (%) | |
|---|---|---|---|---|
| | INITIAL STAGE | AFTER HIGH TEMPERATURE BL EXPOSURE TEST FOR 1000 HOURS | INITIAL STAGE | AFTER HIGH TEMPERATURE BL EXPOSURE TEST FOR 1000 HOURS |
| EXAMPLE 1 | 1500 | 1500 | 99.1 | 97.0 |
| COMPARATIVE EXAMPLE 1 | 1500 | 1450 | 97.8 | 92.0 |
| COMPARATIVE EXAMPLE 2 | 1220 | 1220 | 99.0 | 96.8 |
| COMPARATIVE EXAMPLE 3 | 1500 | 1470 | 97.7 | 91.3 |

As shown in Table 1, the liquid crystal cell of Example 1, in which the conventional alignment film was not formed on the substrate having the NQD-containing organic insulating film, and the alignment film was formed only on the other substrate, showed the high contrast and the high VHR before and after the high temperature BL exposure test for 1000 hours.

On the other hand, the liquid crystal cell of Comparative Example 1 in which the conventional alignment films were formed on the two substrates had a low VHR of the 97% level in the initial stage, and the contrast and VHR were further lowered after the high temperature BL exposure test for 1000 hours. It can be thought that it was caused by the formation of a carboxylic acid from NQD by a reaction shown in FIG. 5, because the substrate having the NQD-containing organic insulating film was heated to 230° C. in the conventional alignment film-forming step, followed by slight elution into the liquid crystal layer, and further by the capture of water by the carboxylic acid during the high temperature BL exposure.

In the liquid crystal cell of Comparative Example 2 in which the conventional alignment film was not formed on the two substrates, the changes in the contrast and VHR were 0 or comparatively small before and after the high temperature BL exposure test, but the contrasts before and after the high temperature BL exposure test were both low, i.e., the 1200 level. The causes thereof can be thought that the liquid crystal alignment property (the degree of alignment of the liquid crystal layer) itself was low because the liquid crystal cell of Comparative Example 2 had no alignment film at all, or the alignment-controlling layer was not uniformly formed, and thus parts having insufficient liquid crystal alignment were partially formed.

In the liquid crystal cell of Comparative Example 3 in which the conventional alignment film was formed only on the substrate having the NQD-containing organic insulating film, and the alignment film was not formed on the other substrate, contrary to Example 1, VHR was low even in the initial stage, and it was further lowered after the high temperature BL exposure test, as in Comparative Example 1. It can be thought that it was caused by the same reasons as in Comparative Example 1.

[Evaluation of Display Reliability]

A narrow frame liquid crystal display panel for evaluation, shown in FIG. 6, was fabricated from a liquid crystal cell 1 having the same structure as that of the cell fabricated in Example 1. As shown in FIG. 6, the width of a counter substrate non-superimposed area in an array substrate 10 was 1.2 mm, and a terminal area TR, formed on the area, was connected to an external power source through an electric wire W, and the like.

The same narrow frame liquid crystal display panel for evaluation as shown in FIG. 6 was fabricated from a liquid crystal cell having the same structure as that of the cell fabricated in Comparative Example 1. The presence or absence of the display unevenness was visually observed on each liquid crystal display panel.

In the liquid crystal display panel having the structure in which the conventional alignment film was not formed on the array substrate having the NQD-containing organic insulating film, and the conventional alignment film was formed only on the counter substrate, similar to the liquid crystal cell of Example 1, the display unevenness was not observed.

On the other hand, in the liquid crystal display panel having the structure in which the conventional alignment films were formed on both substrates of the array substrate having the NQD-containing organic insulating film and the counter substrate, similar to the liquid crystal cell of Comparative Example 1, the voltage was unstably applied because the alignment film was formed even on the terminal area TR (the wire take-out part), and the display unevenness was observed.

Example 2

(Preparation of Liquid Crystal Composition)

A negative liquid crystal composition containing a monomer represented by the chemical formula (1) described above was prepared in the same manner as in Example 1.

(Fabrication of Liquid Crystal Cell)

Using the negative liquid crystal composition prepared as above, a liquid crystal cell 201 in the second embodiment shown in FIGS. 2A and 2B was fabricated as follows:

A counter substrate 220, in which a color filter layer 22 and an intracellular phase difference layer 24 were laminated in order on one plate surface of a glass substrate 21, having no electrode, was prepared.

On the other hand, a glass substrate 11, in which a common electrode 13 formed from ITO, an inorganic insulating film 14 formed from SiN, and pixel electrodes 15 formed from ITO were laminated in order on one plate surface, was prepared. The outermost layer of the plate surface was coated with a polyamic acid alignment agent containing a cyclobutane ring as a photo-aligning group, which horizontally aligned the liquid crystals. A pre-baking at 90° C. for 2 minutes, a primary baking at 200° C. for 20 minutes, a photo-alignment treatment in which deep ultra-violet polarized UV (200 mJ/cm$^2$, 250 nm) was emitted from a normal direction, and a secondary baking at 230° C. for 40 minutes were sequentially performed to form an alignment film 19 which horizontally aligned the liquid crystals (alignment film-forming step), which was used as an array substrate 210.

Next, a UV-curable sealing agent was drawn on one substrate among the two substrates 210 and 220 using a dispenser, and the negative liquid crystal composition, prepared as above, was added dropwise to a given position on the other substrate. Subsequently, the two substrates 210 and 220 were stuck together in vacuo and the sealing agent was cured using ultraviolet light (disposing step).

Subsequently, polarized UV (5 J/cm$^2$, 365 nm) was emitted from the array substrate 210 side (the substrate side on which the polyamic acid photo-alignment film was formed) in a heated state having a temperature of 95° C. to polymerize the polymerizable monomer 40 in the liquid crystal composition 50, whereby alignment-controlling layers 41 and 42, which horizontally aligned the liquid crystals, were formed at the interfaces between the liquid crystal layer 31 and the two substrates 210 and 220 (polymerization step).

As described above, a horizontal alignment liquid crystal cell 201 of Example 2, including the array substrate 210 having the alignment film 19, and the counter substrate 220 having the color filter layer 22 and the intracellular phase difference layer 24 but having no alignment film, was completed.

Comparative Example 4

A liquid crystal cell of Comparative Example 4 was fabricated in the same manner as in Example 2 except that polyamic acid horizontal photo-alignment films were formed on the outermost layers of plate surfaces of a pair of glass substrates, disposed opposite to each other, in the same steps as in Example 2, and the photo-alignment treatment by irradiation of polarized UV was performed.

By the method described above, the horizontal alignment liquid crystal cell of Comparative Example 4, including an array substrate having an alignment film, and a counter substrate having a color filter layer, and intracellular phase difference layer, and an alignment film, was obtained.

Comparative Example 5

A liquid crystal cell of Comparative Example 5 was fabricated in the same manner as in Example 2 except that a polyamic acid horizontal photo-alignment film was not formed on any substrate of the pair of glass substrates.

By the method described above, the horizontal alignment liquid crystal cell of Comparative Example 5, including an array substrate having no alignment film, and a counter substrate having a color filter layer and an intracellular phase difference layer but having no alignment film, was obtained.

Comparative Example 6

According to the same steps as in Example 2, a polyamic acid horizontal photo-alignment film was formed on the outermost layer of a plate surface of a glass substrate having no electrode on which a color filter layer and an intracellular phase difference layer were laminated in order, and the photo-alignment treatment by irradiation of polarized UV was performed. On the other hand, a polyamic acid horizontal photo-alignment film was not formed on a glass substrate in which a common electrode formed from ITO, an inorganic insulating film formed from SiN, and pixel electrodes formed from ITO were laminated in order on one plate surface. A liquid crystal cell of Comparative Example 6 was fabricated in the same manner as in Example 2 except for the above.

By the method described above, the horizontal alignment liquid crystal cell of Comparative Example 6, including an array substrate having no alignment film, and a counter substrate having a color filter layer, an intracellular phase difference layer, and an alignment film, was obtained.

[Evaluation of Liquid Crystal Cells from Example 2, and Comparative Example 4 to Comparative Example 6]

[Evaluation of Contrast (High Temperature BL Exposure Test) and Measurement of VHR (High Temperature BL Exposure Test)]

As for each liquid crystal cell, which was a target for evaluation, contrasts were obtained and VHRs were measured before and after the high temperature BL exposure test under the same conditions as those in Example 1 and the like. The results are shown in Table 2.

TABLE 2

| | PIXEL ELECTRODE SUBSTRATE | COUNTER SUBSTRATE (INCLUDING COLOR FILTER LAYER AND INTRACELLULAR PHASE DIFFERENCE LAYER) | LIQUID CRYSTAL COMPOSITION [POLYMERIZABLE MONOMER] |
|---|---|---|---|
| EXAMPLE 2 | INCLUDING ALIGNMENT FILM | NO ALIGNMENT FILM | NEGATIVE LIQUID CRYSTAL MATERIAL (HORIZONTAL ALIGNMENT) CHALCONE |
| COMPARATIVE EXAMPLE 4 | INCLUDING ALIGNMENT FILM | INCLUDING ALIGNMENT FILM | |

TABLE 2-continued

| | | | CONTRAST | | VHR (%) | |
|---|---|---|---|---|---|---|
| COMPARATIVE EXAMPLE 5 | NO ALIGNMENT FILM | NO ALIGNMENT FILM | | GROUP-CONTAINING MONOMER OF CHEMICAL FORMULA (1) | | |
| COMPARATIVE EXAMPLE 6 | NO ALIGNMENT FILM | INCLUDING ALIGNMENT FILM | | | | |
| | | | INITIAL STAGE | AFTER HIGH TEMPERATURE BL EXPOSURE TEST FOR 1000 HOURS | INITIAL STAGE | AFTER HIGH TEMPERATURE BL EXPOSURE TEST FOR 1000 HOURS |
| | | EXAMPLE 2 | 1300 | 1300 | 99.3 | 97.6 |
| | | COMPARATIVE EXAMPLE 4 | 1000 | 1000 | 97.2 | 94.1 |
| | | COMPARATIVE EXAMPLE 5 | 1130 | 1100 | 99.0 | 97.4 |
| | | COMPARATIVE EXAMPLE 6 | 980 | 940 | 97.0 | 92.3 |

As shown in Table 2, the liquid crystal cell of Example 2 in which the conventional alignment film was not formed on the substrate having the intracellular phase difference layer, and the alignment film was formed only on the other substrate showed the high contrast and the high VHR before and after the high temperature BL exposure test for 1000 hours.

On the other hand, the liquid crystal cell of Comparative Example 4 in which the conventional alignment films were formed on the two substrates had a low VHR of the 97% level in the initial stage, and the contrast in the initial stage was also lower than that in Example 2. After the high temperature BL exposure test for 1000 hours, it was confirmed that VHR was further lowered. It can be thought that it was caused by the change of retardation (phase difference) due to lowering of the degree of alignment of the intracellular phase difference layer by heat, because the substrate having the intracellular phase difference layer was heated to 230° C. in the conventional alignment film-forming step. It can also be supposed that the low VHR in the initial stage resulted from decomposition of a part of the material of the intracellular phase difference layer at a high temperature in the alignment film-forming step, and elution thereof into the liquid crystal layer.

In the liquid crystal cell of Comparative Example 5 in which the conventional alignment film was not formed on the two substrates, the changes in the contrast and the VHR were comparatively small before and after the high temperature BL exposure test, but the contrasts before and after the high temperature BL exposure test were both low, i.e., the 1100 level, which was lower than that in Example 2. The causes thereof can be thought that the liquid crystal alignment property itself was low because the liquid crystal cell of Comparative Example 5 had no conventional alignment film at all, or the alignment-controlling layer was not uniformly formed, and thus parts having insufficient liquid crystal alignment were partially formed.

In the liquid crystal cell of Comparative Example 6 in which the conventional alignment film was formed only on the substrate having the intracellular phase difference layer, and the alignment film was not formed on the other substrate, contrary to Example 2, the contrast and VHR were low even in the initial stage, and they were further lowered by the high temperature BL exposure, as in Comparative Example 4. It can be thought that it was caused by the same reasons as in Comparative Example 4.

Example 3

(Preparation of Liquid Crystal Composition)

In a negative liquid crystal material were contained 1.2% by weight of a radical polymerizable monomer represented by the following chemical formula (3), which had a linear alkyl group as a vertical alignment property-expressing group, and 0.3% by weight of a radical polymerizable monomer represented by the following chemical formula (4) to prepare a negative liquid crystal composition (Tni of 75° C., Δε of −2.8, and Δn of 0.095).

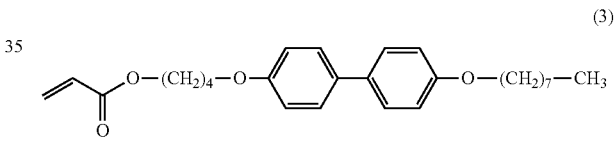

(3)

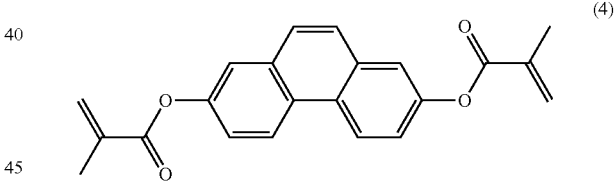

(4)

(Fabrication of Liquid Crystal Cell)

Using the negative liquid crystal composition prepared as above, a liquid crystal cell 301 in the third embodiment shown in FIGS. 3A and 3B was fabricated as follows:

An array substrate 310, in which an organic insulating film 12 containing NQD as a positive resist and a pixel electrode 15 formed from ITO were laminated on one plate surface of a glass substrate 11, was prepared.

On the other hand, a glass substrate 21 having a counter electrode 23 formed from ITO was prepared, and the plate surface on which the counter electrode 23 was formed was coated with a polyamic acid alignment agent containing a cinnamato group as a photo-aligning group, which vertically aligned the liquid crystals. A pre-baking at 90° C. for 5 minutes and a baking at 230° C. for 40 minutes were sequentially performed to form an alignment film 29 which vertically aligned the liquid crystals (alignment film-forming step), which was used as a counter substrate 320. Subsequently, a photo-alignment treatment in which polarized UV (20 mJ/cm², 313 nm) was emitted obliquely in the 40° direction to a half area of the substrate through a mask, and then polarized UV (20 mJ/cm², 313 nm) was emitted obliquely in the −40° direction to the other half area was performed. It was confirmed for the treatment conditions to obtain a pre-tilt angle of 87° by a preliminary experiment.

Next, a UV-curable sealing agent was drawn on one substrate of the two substrates 310 and 320 using a dispenser, and the negative liquid crystal composition, prepared as above, was added dropwise to a given position on the other substrate. Subsequently, the two substrates 310 and 320 were stuck together in vacuo and the sealing agent was cured using ultraviolet light (disposing step).

Subsequently, unpolarized UV (5 J/cm², 365 nm) was emitted from the array substrate 310 side (the substrate side on which the polyamic acid photo-alignment film was not formed) in a heated state having a temperature of 90° C. to polymerize the polymerizable monomer 40 in the liquid crystal composition 50, whereby alignment-controlling layers 41 and 42, which vertically aligned the liquid crystals, were formed at the interfaces between the liquid crystal layer 31 and the two substrates 310 and 320 (polymerization step).

As described above, a two-divided vertical alignment liquid crystal cell 301 of Example 3, including the array substrate 310 having the NQD-containing organic insulating film 312 but having no alignment film, and the counter substrate 320 having the alignment film 329, was completed.

Comparative Example 7

A liquid crystal cell of Comparative Example 7 was fabricated in the same manner as in Example 3 except that a polyamic acid vertical photo-alignment film was formed on the outermost layers of plate surfaces of a pair of glass substrates, disposed opposite to each other, in the same steps as in Example 3, and the photo-alignment treatment by the two-divided polarized UV irradiation was performed.

By the method described above, the two-divided vertical alignment liquid crystal cell of Comparative Example 7, including an array substrate having an NQD-containing organic insulating film and an alignment film, and a counter substrate having an alignment film, was obtained.

Comparative Example 8

A liquid crystal cell of Comparative Example 8 was fabricated in the same manner as in Example 3 except that a polyamic acid vertical photo-alignment film was not formed on any substrate of the pair of glass substrates.

By the method described above, the vertical alignment liquid crystal cell of Comparative Example 8, including an array substrate having an NQD-containing organic insulating film but having no alignment film, and a counter substrate having no alignment film, was obtained.

Comparative Example 9

According to the same steps as in Example 3, a polyamic acid vertical photo-alignment film was formed on the outermost layer of a plate surface of a glass substrate on which an NQD-containing organic insulating film and a pixel electrode formed from ITO were laminated in order, and the photo-alignment treatment by two-divided polarized UV irradiation was performed. On the other hand, a polyamic acid vertical photo-alignment film was not formed on a glass substrate on which the counter electrode formed from ITO was formed. A liquid crystal cell of Comparative Example 9 was fabricated in the same manner as in Example 3 except for the above.

By the method described above, the two-divided vertical alignment liquid crystal cell of Comparative Example 9, including an array substrate having an NQD-containing organic insulating film and an alignment film, and a counter substrate having no alignment film, was obtained.

[Evaluation of Liquid Crystal Cells from Example 3, and Comparative Example 7 to Comparative Example 9]
[Evaluation of Response Characteristic]

Response characteristics (rising and falling) of each liquid crystal cell, which was a target for evaluation, were evaluated using Photal 5200 (manufactured by Otsuka Electronics Co., Ltd.). The evaluation of the response characteristics was performed by measuring a response time between 2.5 V to 7.5 V in an oven having a temperature of 25° C. The results are shown in Table 3.

[Evaluation of Contrast (Multiangle)]

Illuminances of each liquid crystal cell, which was a target for evaluation, upon black display and white display were measured from a front direction and oblique directions at an angle of 20° and −20° in an environment having a temperature of 25° C. using UL-1 manufactured by Topcon Corporation, and a contrast was obtained. The results are shown in Table 3.

[Measurement of VHR (High Temperature BL Exposure Test)]

VHR of each liquid crystal cell, which was a target for evaluation, was measured under the same conditions as in Example 1 and the like before and after the high temperature BL exposure test. The results are shown in Table 3.

TABLE 3

| | PIXEL ELECTRODE SUBSTRATE (INCLUDING NQD-CONTAINING INTERLAYER INSULATING FILM) | COUNTER SUBSTRATE | LIQUID CRYSTAL COMPOSITION [POLYMERIZABLE MONOMER] |
|---|---|---|---|
| EXAMPLE 3 | NO ALIGNMENT FILM | INCLUDING ALIGNMENT FILM (TWO-DIVIDED) | NEGATIVE LIQUID CRYSTAL MATERIAL (VERTICAL ALIGNMENT, PRE-TILT 87°) (MONOMER OF CHEMICAL FORMULA(4) + LONG CHAIN ALKYL GROUP-CONTAINING MONOMER OF CHEMICAL FORMULA(3)) |
| COMPARATIVE EXAMPLE 7 | INCLUDING ALIGNMENT FILM (TWO-DIVIDED) | INCLUDING ALIGNMENT FILM (TWO-DIVIDED) | |
| COMPARATIVE EXAMPLE 8 | NO ALIGNMENT FILM | NO ALIGNMENT FILM | |
| COMPARATIVE EXAMPLE 9 | INCLUDING ALIGNMENT FILM (TWO-DIVIDED) | NO ALIGNMENT FILM | |

TABLE 3-continued

|  | RESPONSE TIME (ms) | | CONTRAST | | | VHR (%) | |
|---|---|---|---|---|---|---|---|
|  |  |  |  | DIRECTION AT ANGLE | DIRECTION AT ANGLE | INITIAL | AFTER HIGH TEMPERATURE BL EXPOSURE TEST |
|  | RISING | FAILING | FRONT | OF +20° | OF −20° | STAGE | FOR 1000 HOURS |
| EXAMPLE 3 | 16 | 12 | 5000 | 3200 | 3200 | 99.3 | 98.2 |
| COMPARATIVE EXAMPLE 7 | 16 | 12 | 5000 | 3200 | 3200 | 98.0 | 94.7 |
| COMPARATIVE EXAMPLE 8 | 67 | 16 | 5400 | 3500 | 3500 | 98.9 | 98.1 |
| COMPARATIVE EXAMPLE 9 | 17 | 12 | 5000 | 3200 | 3200 | 97.4 | 92.1 |

As shown in Table 3, the liquid crystal cell of Example 3, in which the conventional alignment film was not formed on the substrate having the NQD-containing organic insulating film, the alignment film was formed only on the other substrate, and the divisional alignment treatment was performed, had a high response speed, and a high contrast in both of the front direction and the oblique directions, and further a high VHR.

On the other hand, although the liquid crystal cell of Comparative Example 7 in which the conventional alignment films were formed on the two substrates could have a high speed response and a high contrast, VHR was low before and after the high temperature BL exposure test for 1000 hours. It can be thought that it was caused by the formation of a carboxylic acid from NQD in the organic insulating film by a reaction shown in FIG. 5, the elution thereof into the liquid crystal layer, and the capture of water, because the substrate having the NQD-containing organic insulating film was heated to 230° C. in the conventional alignment film-forming step.

In the liquid crystal cell of Comparative Example 8 in which the conventional alignment film was not formed on the two substrates, the response characteristic (particularly, the rising) was extremely slow. The causes thereof can be thought that it was difficult to control the pre-tilt angle to less than 90° and 80° or more only by the alignment-controlling layer, and almost all of the liquid crystal materials in the liquid crystal cell were vertically aligned in a voltage non-applied state (a tilt angle of 90°), and thus a tilting direction of the liquid crystal material was not defined by voltage application.

In the liquid crystal cell of Comparative Example 9 in which the conventional alignment film was formed only on the substrate having the NQD-containing organic insulating film, and the alignment film was not formed on the other substrate, contrary to Example 3, VHR was low even in the initial stage, and it was further lowered by the high temperature BL exposure, as in Comparative Example 7. It can be thought that it was caused by the same reasons as in Comparative Example 7.

In Comparative Example 8, the two substrates had a pre-tilt angle of 90°, and thus the light leakage was very small and the contrast was high at the black display, but the response speed became very slow for that.

Example 4

(Preparation of Liquid Crystal Composition)

In a positive liquid crystal material was contained 1.2% by weight of a radical polymerizable monomer represented by the following chemical formula (2), which had an azobenzene group as a horizontal alignment property-expressing group, to prepare a positive liquid crystal composition (Tni of 70° C., Δε of 2.2, and Δn of 0.12).

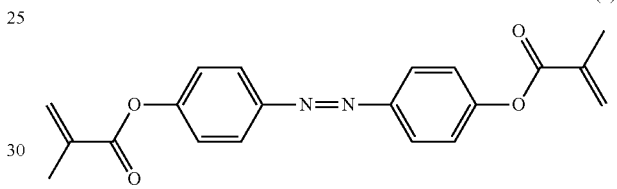

(2)

(Fabrication of Liquid Crystal Cell)

Using the positive liquid crystal composition prepared as above, a liquid crystal cell 401 in the fourth embodiment shown in FIGS. 4A and 4B was fabricated as follows:

A counter substrate 420, in which a color filter layer 22, an intracellular phase difference layer 24, and a counter electrode 23 formed from ITO were laminated in order on one plate surface of a glass substrate 21, was prepared.

On the other hand, a glass substrate 11 in which a pixel electrode 15 formed from ITO was formed on one plate surface was prepared, and a pixel electrode 15 side thereof was coated with a rubbing polyamic acid alignment agent, which horizontally aligned the liquid crystals. A pre-baking at 90° C. for 2 minutes, and a baking at 200° C. for 40 minutes were sequentially performed to form an alignment film 419, which horizontally aligned the liquid crystals (alignment film-forming step), which was used as an array substrate 410. Subsequently, a rubbing alignment treatment was performed under a condition in which a pre-tilt angle was controlled to 4°. The rubbing alignment treatment condition was selected by a preliminary experiment.

Next, a UV-curable sealing agent was drawn on one substrate of the two substrates 410 and 420 using a dispenser, and the positive liquid crystal composition, prepared as above, was added dropwise to a given position on the other substrate. Subsequently, the two substrates 410 and 420 were stuck together in vacuo and the sealing agent was cured using ultraviolet light (disposing step).

Subsequently, polarized UV (5 J/cm², 365 nm) was emitted from the array substrate 410 side (the substrate side on which the polyamic acid alignment film was formed) in a heated state having a temperature of 85° C. to polymerize the polymerizable monomer 40 in the liquid crystal composition 50, whereby alignment-controlling layers 41 and 42, which horizontally aligned the liquid crystals, were formed at the interfaces between the liquid crystal layer 31 and the two substrates 410 and 420 (polymerization step).

As described above, a liquid crystal cell 401, including the array substrate 410 having the alignment film 419 and the counter substrate 420 having the color filter layer 22 and the intracellular phase difference layer 24 but having no alignment film, was completed.

Comparative Example 10

A liquid crystal cell of Comparative Example 10 was fabricated in the same manner as in Example 4 except that polyamic acid horizontal photo-alignment films were formed on the outermost layers of plate surfaces of a pair of glass substrates, disposed opposite to each other, in the same steps as in Example 3, and the rubbing alignment treatment was performed.

By the method described above, the horizontal alignment liquid crystal cell of Comparative Example 10, including an array substrate having an alignment film, and a counter substrate having a color filter layer, an intracellular phase difference layer, and an alignment film, was obtained.

Comparative Example 11

A liquid crystal cell of Comparative Example 11 was fabricated in the same manner as in Example 4 except that a polyamic acid horizontal photo-alignment film was not formed on any substrate of the pair of glass substrates.

By the method described above, the horizontal alignment liquid crystal cell of Comparative Example 11, including an array substrate having no alignment film, and a counter substrate having a color filter layer and an intracellular phase difference layer but having no alignment film, was obtained.

Comparative Example 12

According to the same steps as in Example 4, a polyamic acid horizontal photo-alignment film was formed on the outermost layer of a plate surface of a glass substrate on which a color filter layer, an intracellular phase difference layer, and a counter electrode formed from ITO were laminated in order, and the rubbing alignment treatment was performed. On the other hand, a polyamic acid horizontal photo-alignment film was not formed on a glass substrate in which a pixel electrode formed from ITO was formed on one plate surface. A liquid crystal cell of Comparative Example 12 was fabricated in the same manner as in Example 4 except for the above.

By the method described above, the horizontal alignment liquid crystal cell of Comparative Example 12, including an array substrate having no alignment film, and a counter substrate having a color filter layer, an intracellular phase difference layer, and an alignment film, was obtained.

[Evaluation of Liquid Crystal Cells from Example 4, and Comparative Example 10 to Comparative Example 12]
[Evaluation of Response Characteristic, Evaluation of Contrast, and Measurement of VHR (High Temperature BL Exposure Test)]

Response characteristics of each liquid crystal cell, which was a target for evaluation, were evaluated under the same conditions as in Example 3 and the like except that the measurement voltage region was from 0.5 V to 6.5 V.

The contrast was evaluated under the same conditions as in Example 3 and the like only from the front surface.

VHRs were measured under the same conditions as in Example 1 and the like before and after the high temperature BL exposure test.

The results are shown in Table 4.

TABLE 4

|  | PIXEL ELECTRODE SUBSTRATE | COUNTER SUBSTRATE (INCLUDING COLOR FILTER LAYER AND INTRACELLULAR PHASE DIFFERENCE LAYER) | LIQUID CRYSTAL COMPOSITION [POLYMERIZABLE MONOMER] |
|---|---|---|---|
| EXAMPLE 4 | INCLUDING ALIGNMENT FILM | NO ALIGNMENT FILM | POSITIVE LIQUID CRYSTAL MATERIAL (HORIZONTAL ALIGNMENT, PRE-TILT OF 4°) (AZOBENZENE GROUP-CONTAINING MONOMER OF CHEMICAL FORMULA(2)) |
| COMPARATIVE EXAMPLE 10 | INCLUDING ALIGNMENT FILM | INCLUDING ALIGNMENT FILM | |
| COMPARATIVE EXAMPLE 11 | NO ALIGNMENT FILM | NO ALIGNMENT FILM | |
| COMPARATIVE EXAMPLE 12 | NO ALIGNMENT FILM | INCLUDING ALIGNMENT FILM | |

|  | RESPONSE TIME (ms) | | CONTRAST | VHR (%) | |
|---|---|---|---|---|---|
|  | RISING | FALLING | | INITIAL STAGE | AFTER HIGH TEMPERATURE BL EXPOSURE TEST FOR 1000 HOURS |
| EXAMPLE 4 | 4.5 | 4.2 | 900 | 99.4 | 98.8 |
| COMPARATIVE EXAMPLE 10 | 4.6 | 4.1 | 700 | 99.0 | 98.0 |
| COMPARATIVE EXAMPLE 11 | 11.2 | 5.3 | 900 | 99.3 | 98.8 |
| COMPARATIVE EXAMPLE 12 | 4.4 | 4.3 | 700 | 99.2 | 98.2 |

As shown in Table 4, the liquid crystal cell of Example 4, in which the conventional alignment film was not formed on the substrate having the intracellular phase difference layer, and the alignment film was formed only on the other substrate, showed a high speed response, a high contrast, and a high VHR.

On the other hand, the liquid crystal cell of Comparative Example 10 in which the conventional alignment films were formed on the two substrates had a low contrast, and a VHR slightly lower than that in Example 4. It can be thought that it was caused by the changed retardation due to lowering of the degree of alignment of the intracellular phase difference layer by heat, because the substrate having the intracellular phase difference layer was heated to 200° C. in the conventional alignment film-forming step. It can also be supposed that the low VHR in the initial stage resulted from the decomposition of a part of the material of the intracellular phase difference layer at a high temperature in the alignment film-forming step, and elution thereof into the liquid crystal layer.

In the liquid crystal cell of Comparative Example 11 in which the conventional alignment film was not formed on the two substrates, the response characteristic (particularly, the rising) was extremely slow. The causes thereof can be thought that it was difficult to control the pre-tilt angle to more than 0° and 5° or less only by the alignment-controlling layer, and almost all of the liquid crystal materials in the liquid crystal cell were horizontally aligned in a voltage non-applied state (a tilt angle of 0°), and thus a moving direction of the liquid crystal material was not defined by voltage application.

In the liquid crystal cell of Comparative Example 12 in which the conventional alignment film was formed only on the substrate having the intracellular phase difference layer, and the alignment film was not formed on the other substrate, contrary to Example 4, the contrast and VHR were low, as in Comparative Example 10. It can be thought that it was caused by the same reasons as in Comparative Example 10.

In Comparative Example 11, the two substrates had a pre-tilt angle of almost 0°, and thus the light leakage was very small and the contrast was high at the black display, but the response speed became very slow for that.

The invention claimed is:

1. A liquid crystal display comprising:
a pair of substrates;
a liquid crystal layer, which is disposed between the pair of substrates and includes a liquid crystal material; and
an alignment-controlling layer, which is formed by polymerization of a polymerizable monomer added to a liquid crystal composition forming the liquid crystal layer so as to be brought into contact with the liquid crystal layer, and controls an alignment of the liquid crystal material to the substrate at a predetermined angle, wherein
one substrate of the pair of substrates has an alignment film coated and formed so as to be brought into contact with the alignment-controlling layer, and the other substrate has no alignment film,
the alignment-controlling layer is formed by polymerization of a radical polymerizable monomer having a chalcone group or an azobenzene group,
the alignment-controlling layer is formed by polymerization of the radical polymerizable monomer represented by the following chemical formulae (1) or (2),

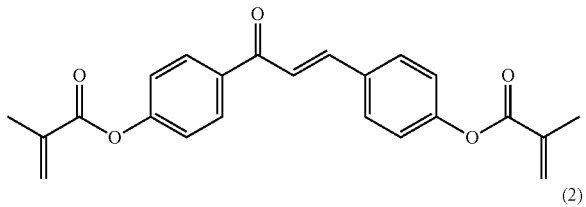

(1)

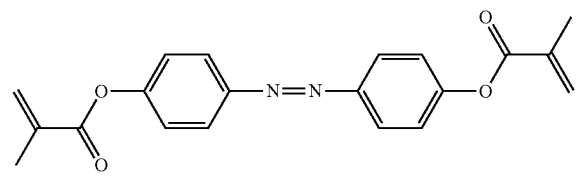

(2)

the alignment film is a polyamic acid photo-alignment film having a photo-aligning group.

2. The liquid crystal display according to claim 1, wherein the other substrate has an insulating film including naphthoquinone diazide.

3. The liquid crystal display according to claim 1, wherein the other substrate has an intracellular phase difference layer.

4. The liquid crystal display according to claim 1, wherein the alignment of the liquid crystal material is controlled so as to have a pre-tilt angle of more than 0° and 10° or less, or less than 90° and 80° or more at the one substrate side of the liquid crystal layer.

5. The liquid crystal display according to claim 1, wherein the alignment film formed on the one substrate has a plurality of areas which align the liquid crystal material in different directions.

6. A method for producing a liquid crystal display, the method comprising:
an alignment film-forming step in which one plate surface of one substrate is coated with an alignment film-forming resin and a high temperature treatment is performed to form an alignment film;
a disposing step in which another substrate is disposed on the one plate surface side of the one substrate such that the plate surfaces are opposite to each other, and a liquid crystal composition including a liquid crystal material and a polymerizable monomer is disposed between the two substrates; and
a polymerization step in which, after the disposing step, the polymerizable monomer in the liquid crystal composition is polymerized to form a liquid crystal layer containing the liquid crystal material, and an alignment-controlling layer, which is brought into contact with the liquid crystal layer and controls an alignment of the liquid crystal material to the two substrates at a predetermined angle, between the two substrates, wherein
the alignment-controlling layer includes a polymer formed by polymerization of the polymerizable monomer,
the other substrate has no alignment film,
the polymerizable monomer is represented by the following chemical formulae (1), (2), (3), or (4)

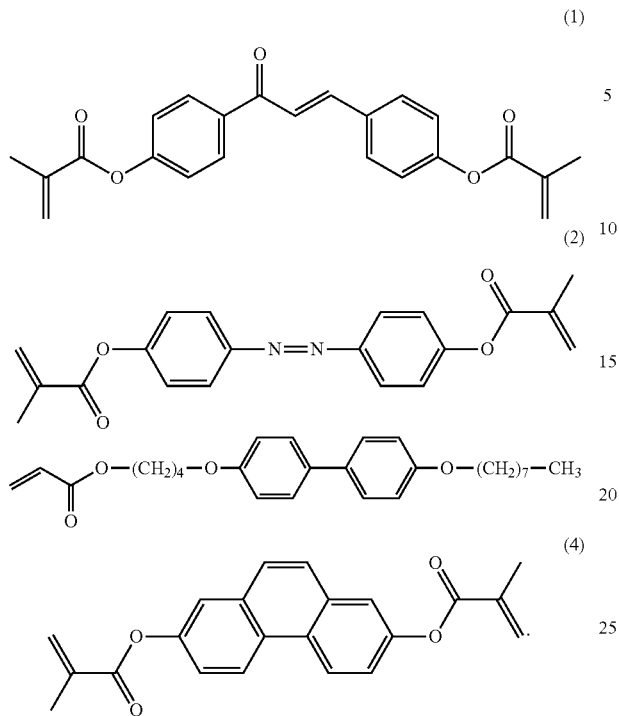

(1)

(2)

(4)

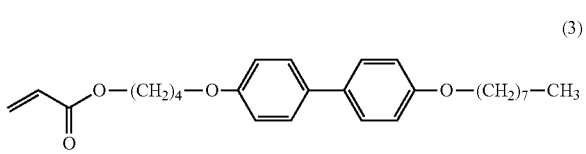

(3)

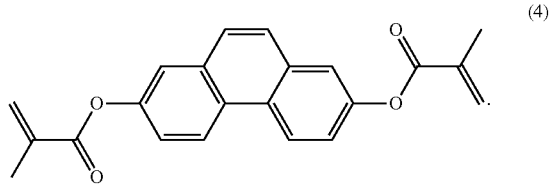

(4)

7. A liquid crystal display comprising:
a pair of substrates;
a liquid crystal layer, which is disposed between the pair of substrates and includes a liquid crystal material; and
an alignment-controlling layer, which is formed by polymerization of a polymerizable monomer added to a liquid crystal composition forming the liquid crystal layer so as to be brought into contact with the liquid crystal layer, and controls an alignment of the liquid crystal material to the substrate at a predetermined angle, wherein one substrate of the pair of substrates has an alignment film coated and formed so as to be brought into contact with the alignment-controlling layer, and the other substrate has no alignment film, the alignment-controlling layer is formed by polymerization of a radical polymerizable monomer having a linear alkyl group with 8 or more and 24 or less carbon atoms, the alignment-controlling layer is formed by polymerization of the radical polymerizable monomer represented by the following chemical formulae (3) or (4)

8. The liquid crystal display according to claim 7, wherein the other substrate has an insulating film including naphthoquinone diazide.

9. The liquid crystal display according to claim 7, wherein the other substrate has an intracellular phase difference layer.

10. The liquid crystal display according to claim 7, wherein the alignment of the liquid crystal material is controlled so as to have a pre-tilt angle of more than 0° and 10° or less, or less than 90° and 80° or more at the one substrate side of the liquid crystal layer.

* * * * *